(12) United States Patent
Noureldin et al.

(10) Patent No.: US 10,451,359 B2
(45) Date of Patent: *Oct. 22, 2019

(54) NATURAL GAS LIQUID FRACTIONATION PLANT WASTE HEAT CONVERSION TO POWER USING KALINA CYCLE

(71) Applicant: Saudi Arabian Oil Company, Dhahran (SA)

(72) Inventors: Mahmoud Bahy Mahmoud Noureldin, Dhahran (SA); Akram Hamed Mohamed Kamel, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 56 days.

This patent is subject to a terminal disclaimer.

(21) Appl. No.: 15/842,515

(22) Filed: Dec. 14, 2017

(65) Prior Publication Data

US 2019/0049191 A1 Feb. 14, 2019

Related U.S. Application Data

(60) Provisional application No. 62/542,687, filed on Aug. 8, 2017.

(51) Int. Cl.
*F28D 21/00* (2006.01)
*C02F 1/16* (2006.01)
(Continued)

(52) U.S. Cl.
CPC ....... *F28D 21/0001* (2013.01); *B01D 1/0058* (2013.01); *B01D 1/26* (2013.01);
(Continued)

(58) Field of Classification Search
CPC ......... C02F 1/16; B01D 32/002; F01K 25/06; F01K 27/02; F28D 21/00
See application file for complete search history.

(56) References Cited

U.S. PATENT DOCUMENTS 2,685,152 A 8/1954 Dann
4,907,410 A 3/1990 Chang
(Continued)

FOREIGN PATENT DOCUMENTS

WO 2006039182 4/2006
WO 2012003525 1/2012
WO 2017035166 3/2017

OTHER PUBLICATIONS

International Search Report and Written Opinion issued in International Application No. PCT/US2018/045554 dated Nov. 22, 2018, 21 pages.
(Continued)

*Primary Examiner* — Brian A McCaig
(74) *Attorney, Agent, or Firm* — Fish & Richardson P.C.

(57) ABSTRACT

Certain aspects of natural gas liquid fractionation plant waste heat conversion to power using Kalina Cycle can be implemented as a system. The system includes a waste heat recovery heat exchanger configured to heat a buffer fluid stream by exchange with a heat source in a natural gas liquid fractionation plant. The system includes a Kalina cycle energy conversion system, which includes one or more first energy conversion heat exchangers configured to heat a working fluid by exchange with the heated buffer fluid stream, a separator configured to receive the heated working fluid and to output a vapor stream of the working fluid and the liquid stream of the working fluid, and a turbine and a generator, wherein the turbine and generator are configured to generate power by expansion of the vapor stream of the working fluid.

53 Claims, 16 Drawing Sheets

(51) Int. Cl.
| | |
|---|---|
| F01K 25/06 | (2006.01) |
| F01K 27/02 | (2006.01) |
| B01D 1/00 | (2006.01) |
| B01D 1/26 | (2006.01) |
| C10G 5/06 | (2006.01) |
| C10G 7/00 | (2006.01) |
| B01D 3/06 | (2006.01) |
| B01D 3/14 | (2006.01) |
| F25J 3/02 | (2006.01) |
| B01D 53/00 | (2006.01) |
| B01D 53/14 | (2006.01) |
| B01D 53/26 | (2006.01) |
| C02F 103/08 | (2006.01) |
| F01K 25/10 | (2006.01) |

(52) U.S. Cl.
CPC ............ *B01D 3/065* (2013.01); *B01D 3/146* (2013.01); *C02F 1/16* (2013.01); *C10G 5/06* (2013.01); *C10G 7/00* (2013.01); *F01K 25/06* (2013.01); *F01K 27/02* (2013.01); *F25J 3/0209* (2013.01); *F25J 3/0233* (2013.01); *F25J 3/0238* (2013.01); *F25J 3/0242* (2013.01); *B01D 53/002* (2013.01); *B01D 53/1456* (2013.01); *B01D 53/263* (2013.01); *C02F 2103/08* (2013.01); *F01K 25/10* (2013.01); *F25J 2200/02* (2013.01); *F25J 2200/70* (2013.01); *F25J 2200/74* (2013.01); *F25J 2215/62* (2013.01); *F25J 2240/70* (2013.01); *F25J 2260/02* (2013.01); *F25J 2270/12* (2013.01); *F25J 2270/60* (2013.01); *F28D 2021/0019* (2013.01)

(56) References Cited

U.S. PATENT DOCUMENTS

| | | | | |
|---|---|---|---|---|
| 6,216,436 | B1* | 4/2001 | Ranasinghe | F01K 23/068 |
| | | | | 60/39.12 |
| 7,257,966 | B2 | 8/2007 | Lee et al. | |
| 7,458,231 | B1 | 12/2008 | Vanden | |
| 9,745,871 | B2* | 8/2017 | Noureldin | F01K 25/065 |
| 2008/0174115 | A1 | 7/2008 | Lambirth | |
| 2008/0190135 | A1 | 8/2008 | Mak | |
| 2010/0326131 | A1 | 12/2010 | Lengert | |
| 2011/0000205 | A1 | 1/2011 | Hauer | |
| 2013/0341929 | A1 | 12/2013 | Ho | |
| 2014/0223911 | A1 | 8/2014 | Ikegami | |
| 2015/0377079 | A1 | 12/2015 | Noureldin et al. | |
| 2017/0058708 | A1 | 3/2017 | Noureldin et al. | |
| 2017/0058711 | A1 | 3/2017 | Noureldin et al. | |
| 2017/0058719 | A1* | 3/2017 | Noureldin | F01K 25/065 |
| 2017/0058721 | A1 | 3/2017 | Noureldin et al. | |
| 2019/0048759 | A1 | 2/2019 | Noureldin et al. | |

OTHER PUBLICATIONS

International Search Report and Written Opinion issued in International Application No. PCT/US2018/045557 dated Nov. 22, 2018, 19 pages.
International Search Report and Written Opinion issued in International Application No. PCT/US2018/045550 dated Nov. 22, 2018, 18 pages.
International Search Report and Written Opinion issued in International Application No. PCT/US2018/045629 dated Nov. 22, 2018, 16 pages.
International Search Report and Written Opinion issued in International Application No. PCT/US2018/045531 dated Nov. 22, 2018, 20 pages.
International Search Report and Written Opinion issued in International Application No. PCT/US2018/045547 dated Nov. 22, 2018, 20 pages.
International Search Report and Written Opinion issued in International Application No. PCT/US2018/045640 dated Nov. 22, 2018, 19 pages.
International Search Report and Written Opinion issued in International Application No. PCT/US2018/045535 dated Nov. 22, 2018, 23 pages.
International Search Report and Written Opinion issued in International Application No. PCT/US2018/045558 dated Nov. 22, 2018, 22 pages.
International Search Report and Written Opinion issued in International Application No. PCT/US2018/045541 dated Nov. 22, 2018, 17 pages.
International Search Report and Written Opinion issued in International Application No. PCT/US2018/045537 dated Nov. 22, 2018, 16 pages.
International Search Report and Written Opinion issued in International Application No. PCT/US2018/045564 dated Nov. 22, 2018, 21 pages.
International Search Report and Written Opinion issued in International Application No. PCT/US2018/045622 dated Nov. 22, 2018, 18 pages.
Neill and Gunter, "Generation of Electric Power from Waste Heat in the Western Canadian Oil and Gas Industry Phase 1 Report—Scoping Evaluations Rev A," Petroleum Technology Alliance Canada (PTAC), Oct. 2007, 148 pages.
Bahnassi et al., "Achieving product specifications for ethane through to pentane plus from NGL fraction plants," AIChE Fall Conference, Jan. 1, 2005, 21 pages.
Rosenzweig, "Cryogenics for natural gas extraction/fractionation," Chemical engineering, access intelligence association, vol. 1, No. 77, Jan. 12, 1970, 3 pages.
Zhang et al., "Network modeling and design for low grade heat recovery, refrigeration, and utilization in Industrial parks," Industrial and Engineering Chemistry Research, vol. 55, No. 36, Sep. 14, 2016, 13 pages.
Kwak et al., "Integrated design and optimization of technologies for utilizing low grade heat in process industries," Applied Energy, vol. 131, Oct. 1, 2014, 16 pages.
Lira-Barragan et al., "Sustainable Integration of Trigeneration Systems with Head Exchanger Networks," Industrial & Engineering Chemistry Research, vol. 53, No. 7, Feb. 4, 2014, 19 pages.
Ammar et al., "Low grade thermal energy sources and uses from the process industry in the UK," Applied Energy, Elsevier Science Publishers, vol. 89, No. 1, Jun. 1, 2011, 18 pages.
Gaberiel et al., "Optimization across the water-energy nexus for integrating heat, power, and water for industrial processes, couples with the hybrid thermal-membrane dealination," Industrial and Engineering Chemistry Research, vol. 55, No. 12, Feb. 16, 2016, 25 pages.
Gonzalez-Bravo et al., "Optimal Design for Water Desalination Systems Involving Waste Heat Recovery," Industrial and Engineering Chemistry Research, vol. 56, No. 7, Feb. 8, 2017, 14 pages.
Ophir et al., "Advanced MED process for most economical sea water desalination," Desalination, Elsevier, Amsterdam, NL, vol. 182, No. 1-3, Nov. 1, 2005, 12 pages.
Gnaneswar Gude et al., "Feasibility study of a new two-stage low temperature desalination process," Energy Conversation and Management, Elsevier Science Publishers, vol. 56, Nov. 30, 2011, 7 pages.
M. Mehrpooya et al., "Introducing a novel integrated NGL recovery process configuration (with a self-refrigeration system (open-closed cycle)) with minimum energy requirement," Chemical Engineering and Processing: Process Intensification, Apr. 2010, vol. 49, No. 4, pp. 376-388.
Rahimi et al., "A novel process for low grade heat driven desalination," Desalination, Oct. 15, 2014, vol. 351, pp. 202-212.

(56) References Cited

OTHER PUBLICATIONS

Zhu et al., "Hybrid vapor compression refrigeration system with an integrated ejector cooling cycle," International Journal of Refrigeration, vol. 35, 2012, 11 pages.

* cited by examiner

NATURAL GAS LIQUID FRACTIONATION PLANT WASTE HEAT CONVERSION TO POWER USING KALINA CYCLE

CROSS-REFERENCE TO RELATED APPLICATIONS

This disclosure claims the benefit of priority to U.S. Application Ser. No. 62/542,687 entitled "Utilizing Waste Heat Recovered From Natural Gas Liquid Fractionation Plants", which was filed on Aug. 8, 2017, the entire contents of which are incorporated herein by reference.

TECHNICAL FIELD

This disclosure relates to operating industrial facilities, for example, a natural gas liquid fractionation plant or other industrial facilities that include operating plants that generate heat, for example, a natural gas liquid fractionation plant.

BACKGROUND

Natural gas liquid (NGL) processes are chemical engineering processes and other facilities used in petroleum refineries to transform natural gas into products, for example, liquefied petroleum gas (LPG), gasoline, kerosene, jet fuel, diesel oils, fuel oils, and such products. NGL facilities are large industrial complexes that involve many different processing units and auxiliary facilities, for example, utility units, storage tanks, and such auxiliary facilities. Each refinery can have its own unique arrangement and combination of refining processes determined, for example, by the refinery location, desired products, economic considerations, or such factors. The NGL processes that are implemented to transform the natural gas into the products such as those listed earlier can generate heat, which may not be reused, and byproducts, for example, greenhouse gases (GHG), which may pollute the atmosphere. It is believed that the world's environment has been negatively affected by global warming caused, in part, due to the release of GHG into the atmosphere.

SUMMARY

This specification describes technologies relating to cooling capacity generation, power generation or potable water production from waste heat in a natural gas liquid (NGL) fractionation plant.

The present disclosure includes one or more of the following units of measure with their corresponding abbreviations, as shown in Table 1:

TABLE 1

| Unit of Measure | Abbreviation |
| --- | --- |
| Degrees Celsius | ° C. |
| Megawatts | MW |
| One million | MM |
| British thermal unit | Btu |
| Hour | h |
| Pounds per square inch (pressure) | psi |
| Kilogram (mass) | Kg |
| Second | S |
| Cubic meters per day | m³/day |
| Fahrenheit | F. |

An example implementation includes a system. The system includes a waste heat recovery heat exchanger configured to heat a buffer fluid stream by exchange with a heat source in a natural gas liquid fractionation plant. The system includes a Kalina cycle energy conversion system, which includes one or more first energy conversion heat exchangers configured to heat a working fluid by exchange with the heated buffer fluid stream, a separator configured to receive the heated working fluid and to output a vapor stream of the working fluid and the liquid stream of the working fluid, and a turbine and a generator, wherein the turbine and generator are configured to generate power by expansion of the vapor stream of the working fluid.

This, and other aspects, can include one or more of the following features. In another aspect combinable with any of the previous aspects, the turbine and generator are configured to generate at least 40 MW of power. In another aspect combinable with any of the previous aspects, the energy conversion system includes a pump configured to pump the working fluid to a pressure of between 7 Bar and 8 Bar. In another aspect combinable with any of the previous aspects, the one or more first energy conversion heat exchangers include an energy conversion heat exchanger having a thermal duty of between 250 MM Btu/h and 350 MM Btu/h, and an energy conversion heat exchanger having a thermal duty of between 1300 MM Btu/h and about 1500 MM Btu/h. In another aspect combinable with any of the previous aspects, the one or more first energy conversion heat exchangers are configured to heat the first portion of the working fluid to a temperature of between 160° F. and 180° F. In another aspect combinable with any of the previous aspects, the one or more first energy conversion heat exchangers are configured to heat a first portion of the working fluid. In another aspect combinable with any of the previous aspects, the Kalina cycle energy conversion system includes one or more second energy conversion heat exchangers configured to heat a second portion of the working fluid by exchange with the liquid stream of the working fluid. In another aspect combinable with any of the previous aspects, the separator is configured to receive the heated first and second portions of the working fluid. In another aspect combinable with any of the previous aspects, the one or more second energy conversion heat exchangers are configured to heat the second portion of the working fluid by exchange with the heated buffer fluid stream. In another aspect combinable with any of the previous aspects, the one or more second energy conversion heat exchangers include an energy conversion heat exchanger having a thermal duty of between 250 MM Btu/h and 350 MM Btu/h, and an energy conversion heat exchanger having a thermal duty of between 1200 MM Btu/h and about 1400 MM Btu/h. In another aspect combinable with any of the previous aspects, the one or more second energy conversion heat exchangers are configured to heat the second portion of the working fluid to a temperature of between 160° F. and 180° F. In another aspect combinable with any of the previous aspects, the system includes a second turbine configured to generate power from the liquid stream of the working fluid. In another aspect combinable with any of the previous aspects, the second turbine is configured to generate at least 1 MW of power. In another aspect combinable with any of the previous aspects, the second turbine includes a high pressure recovery turbine. In another aspect combinable with any of the previous aspects, the Kalina cycle energy conversion system includes a cooler configured to cool the vapor stream of the working fluid and the liquid stream of the working fluid after power generation. In another aspect combinable with any of the previous aspects, the cooler has a thermal duty of between 2500 MM Btu/h and 3500 MM Btu/h. In another aspect combinable with any of the previous aspects, the system includes a storage tank. In another aspect combinable with any of the previous aspects, the buffer fluid stream flows from the storage tank, through the waste heat recovery heat exchanger, through the Kalina cycle energy conversion system, and back to the storage tank. In another aspect combinable with any of the previous aspects, the waste heat recovery heat exchanger is configured to heat the buffer fluid stream by exchange with a refrigerant in the natural gas liquid fractionation plant. In another aspect combinable with any of the previous aspects, the refrigerant is used to cool ethane gas output from a deethanizer in the natural gas liquid fractionation plant. In another aspect combinable with any of the previous aspects, the waste heat recovery heat exchanger is configured to heat the buffer fluid stream by exchange with propane gas output from a depropanizer in the natural gas liquid fractionation plant. In another aspect combinable with any of the previous aspects, the waste heat recovery heat exchanger is configured to heat the buffer fluid stream by exchange with propane gas output from a propane dehydrator in the natural gas liquid fractionation plant. In another aspect combinable with any of the previous aspects, the waste heat recovery heat exchanger is configured to heat the buffer fluid stream by exchange with a C5+ bottoms product from a debutanizer in the natural gas liquid fractionation plant. In another aspect combinable with any of the previous aspects, the waste heat recovery heat exchanger is configured to heat the buffer fluid stream by exchange with butane gas output from a debutanizer in the natural gas liquid fractionation plant. In another aspect combinable with any of the previous aspects, the waste heat recovery heat exchanger is configured to heat the buffer fluid stream by exchange with butane gas output from a butane dehydrator in the natural gas liquid fractionation plant. In another aspect combinable with any of the previous aspects, the waste heat recovery heat exchanger is configured to heat the buffer fluid stream by exchange with pentane gas output from a depentanizer in the natural gas liquid fractionation plant. In another aspect combinable with any of the previous aspects, the waste heat recovery exchanger is configured to heat the buffer fluid stream by exchange with acid gases output from an ADIP generator in the natural gas liquid fractionation plant. In another aspect combinable with any of the previous aspects, the waste heat recovery exchanger is configured to heat the buffer fluid stream by exchange with lean ADIP output from an ADIP generator in the natural gas liquid fractionation plant. In another aspect combinable with any of the previous aspects, the waste heat recovery exchanger is configured to heat the buffer fluid stream by exchange with light NG components output from a pre-flash drum in a decolorizing section of the natural gas liquid fractionation plant. In another aspect combinable with any of the previous aspects, the waste heat recovery exchanger is configured to heat the buffer fluid stream by exchange with NG gas output from a decolorizer in the natural gas liquid fractionation plant. In another aspect combinable with any of the previous aspects, the waste heat recovery exchanger is configured to heat the buffer fluid stream by exchange with compressed propane in the natural gas liquid fractionation plant. In another aspect combinable with any of the previous aspects, the waste heat recovery exchanger is configured to heat the buffer fluid stream by exchange with compressed butane in the natural gas liquid fractionation plant. In another aspect combinable with any of the previous aspects, the waste heat recovery exchanger is configured to heat the buffer fluid stream by exchange with dry ethane gas in the natural gas liquid fractionation plant.

In another aspect combinable with any of the previous aspects, the waste heat recovery exchanger is configured to heat the buffer fluid stream by exchange with pentane gas output from an RVP column in the natural gas liquid fractionation plant.

An example implementation includes a method. A buffer fluid stream is heated via a waste heat recovery heat exchanger by exchange with a heat source in a natural gas liquid fractionation plant. Power is generated in a Kalina cycle energy conversion system. To generate the power, a working fluid is heated via one or more first energy conversion heat exchangers by exchange with the heated buffer fluid stream. In a separator, the heated working fluid is separated into a vapor stream of the working fluid and the liquid stream of the working fluid. By a first turbine and generator, power is generated by expansion of the vapor stream of the working fluid.

This, and other aspects, can include one or more of the following features. In another aspect combinable with any of the previous aspects, the turbine and generator are configured to generate at least 40 MW of power. In another aspect combinable with any of the previous aspects, the energy conversion system includes a pump configured to pump the working fluid to a pressure of between 7 Bar and 8 Bar. In another aspect combinable with any of the previous aspects, the one or more first energy conversion heat exchangers include an energy conversion heat exchanger having a thermal duty of between 250 MM Btu/h and 350 MM Btu/h, and an energy conversion heat exchanger having a thermal duty of between 1300 MM Btu/h and about 1500 MM Btu/h. In another aspect combinable with any of the previous aspects, the one or more first energy conversion heat exchangers are configured to heat the first portion of the working fluid to a temperature of between 160° F. and 180° F. In another aspect combinable with any of the previous aspects, the one or more first energy conversion heat exchangers are configured to heat a first portion of the working fluid. In another aspect combinable with any of the previous aspects, the Kalina cycle energy conversion system includes one or more second energy conversion heat exchangers configured to heat a second portion of the working fluid by exchange with the liquid stream of the working fluid. In another aspect combinable with any of the previous aspects, the separator is configured to receive the heated first and second portions of the working fluid. In another aspect combinable with any of the previous aspects, the one or more second energy conversion heat exchangers are configured to heat the second portion of the working fluid by exchange with the heated buffer fluid stream. In another aspect combinable with any of the previous aspects, the one or more second energy conversion heat exchangers include an energy conversion heat exchanger having a thermal duty of between 250 MM Btu/h and 350 MM Btu/h, and an energy conversion heat exchanger having a thermal duty of between 1200 MM Btu/h and about 1400 MM Btu/h. In another aspect combinable with any of the previous aspects, the one or more second energy conversion heat exchangers are configured to heat the second portion of the working fluid to a temperature of between 160° F. and 180° F. In another aspect combinable with any of the previous aspects, the system includes a second turbine configured to generate power from the liquid stream of the working fluid. In another aspect combinable with any of the previous aspects, the second turbine is configured to generate at least 1 MW of power. In another aspect combinable with any of the previous aspects, the second turbine includes a high pressure recovery turbine. In another aspect combinable with any of the previous aspects, the Kalina cycle energy conversion system includes a cooler configured to cool the vapor stream of the working fluid and the liquid stream of the working fluid after power generation. In another aspect combinable with any of the previous aspects, the cooler has a thermal duty of between 2500 MM Btu/h and 3500 MM Btu/h. In another aspect combinable with any of the previous aspects, the system includes a storage tank. In another aspect combinable with any of the previous aspects, the buffer fluid stream flows from the storage tank, through the waste heat recovery heat exchanger, through the Kalina cycle energy conversion system, and back to the storage tank. In another aspect combinable with any of the previous aspects, the waste heat recovery heat exchanger is configured to heat the buffer fluid stream by exchange with a refrigerant in the natural gas liquid fractionation plant. In another aspect combinable with any of the previous aspects, the refrigerant is used to cool ethane gas output from a deethanizer in the natural gas liquid fractionation plant. In another aspect combinable with any of the previous aspects, the waste heat recovery heat exchanger is configured to heat the buffer fluid stream by exchange with propane gas output from a depropanizer in the natural gas liquid fractionation plant. In another aspect combinable with any of the previous aspects, the waste heat recovery heat exchanger is configured to heat the buffer fluid stream by exchange with propane gas output from a propane dehydrator in the natural gas liquid fractionation plant. In another aspect combinable with any of the previous aspects, the waste heat recovery heat exchanger is configured to heat the buffer fluid stream by exchange with a C5+ bottoms product from a debutanizer in the natural gas liquid fractionation plant. In another aspect combinable with any of the previous aspects, the waste heat recovery heat exchanger is configured to heat the buffer fluid stream by exchange with butane gas output from a debutanizer in the natural gas liquid fractionation plant. In another aspect combinable with any of the previous aspects, the waste heat recovery heat exchanger is configured to heat the buffer fluid stream by exchange with butane gas output from a butane dehydrator in the natural gas liquid fractionation plant. In another aspect combinable with any of the previous aspects, the waste heat recovery heat exchanger is configured to heat the buffer fluid stream by exchange with pentane gas output from a depentanizer in the natural gas liquid fractionation plant. In another aspect combinable with any of the previous aspects, the waste heat recovery exchanger is configured to heat the buffer fluid stream by exchange with acid gases output from an ADIP generator in the natural gas liquid fractionation plant. In another aspect combinable with any of the previous aspects, the waste heat recovery exchanger is configured to heat the buffer fluid stream by exchange with lean ADIP output from an ADIP generator in the natural gas liquid fractionation plant. In another aspect combinable with any of the previous aspects, the waste heat recovery exchanger is configured to heat the buffer fluid stream by exchange with light NG components output from a pre-flash drum in a decolorizing section of the natural gas liquid fractionation plant. In another aspect combinable with any of the previous aspects, the waste heat recovery exchanger is configured to heat the buffer fluid stream by exchange with NG gas output from a decolorizer in the natural gas liquid fractionation plant. In another aspect combinable with any of the previous aspects, the waste heat recovery exchanger is configured to heat the buffer fluid stream by exchange with compressed propane in the natural gas liquid fractionation plant. In another aspect combinable with any of the previous aspects, the waste heat recovery exchanger is configured to heat the buffer fluid stream by exchange with compressed butane in the natural gas liquid fractionation plant. In another aspect combinable with any of the previous aspects, the waste heat recovery exchanger is configured to heat the buffer fluid stream by exchange with dry ethane gas in the natural gas liquid fractionation plant. In another aspect combinable with any of the previous aspects, the waste heat recovery exchanger is configured to heat the buffer fluid stream by exchange with pentane gas output from an RVP column in the natural gas liquid fractionation plant.

The details of one or more implementations of the subject matter described in this specification are set forth in the accompanying drawings and the detailed description. Other features, aspects, and advantages of the subject matter will become apparent from the description, the drawings, and the claims.

DETAILED DESCRIPTION

NGL Plant

Figure 1A:
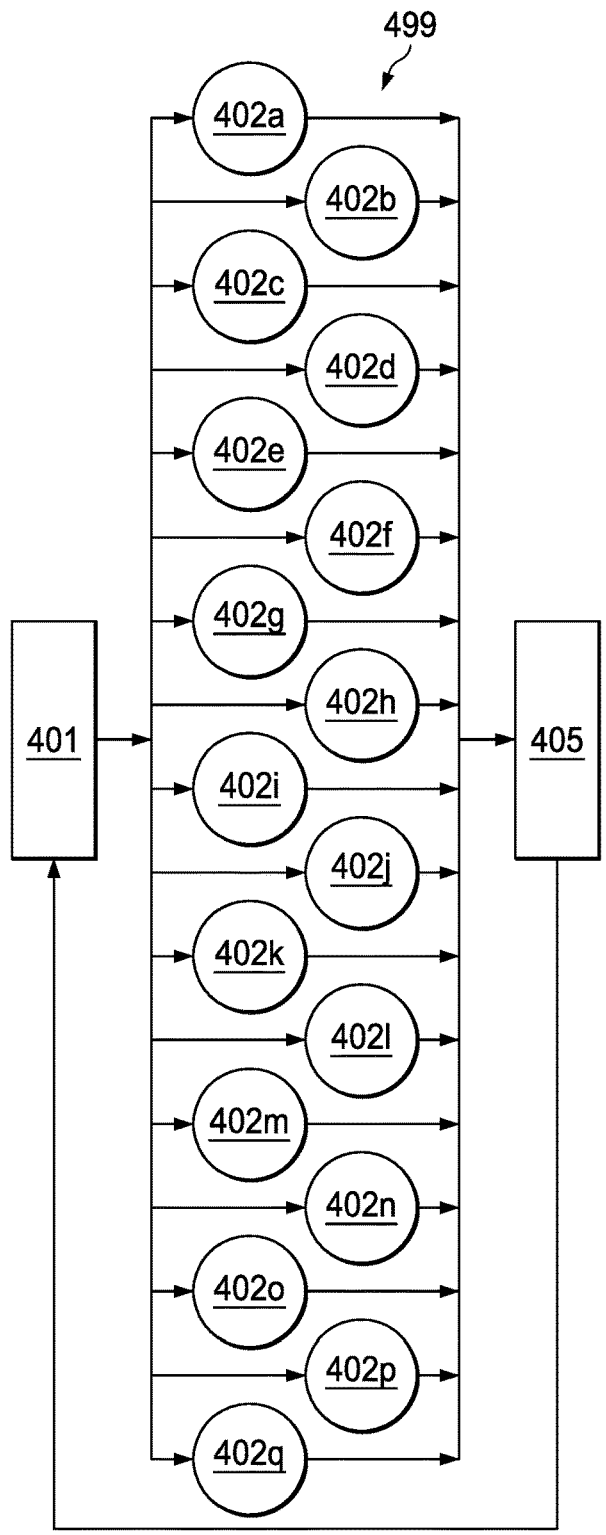
FIG. 1A is a diagram of a low grade waste heat recovery system.

Gas processing plants can purify raw natural gas or crude oil production associated gases (or both) by removing common contaminants such as water, carbon dioxide and hydrogen sulfide. Some of the substances which contaminate natural gas have economic value and can be processed or sold or both. Upon the separation of methane gas, which is useful as sales gas for houses and power generation, the remaining hydrocarbon mixture in liquid phase is called natural gas liquids (NGL). The NGL is fractionated in a separate plant or sometimes in the same gas processing plant into ethane, propane and heavier hydrocarbons for several versatile uses in chemical and petrochemical as well as transportation industries. The NGL fractionation plant uses the following processes or sections: fractionation, product treating, and natural gasoline processing. The fractionation processes or sections can include heat sources (also commonly referred to as streams) including, but not limited to, a propane condenser, a propane refrigerant condenser, a naphtha cooler, a de-pentanizer condenser, an amine-di-isopropanol (ADIP) cooler, a regenerator overhead (OVHD) condenser, a Reid vapor pressure (RVP) column condenser, a de-propanizer condenser, a de-butanizer condenser, or combinations thereof. The product treating processes or sections can include the following non-limiting heat sources: a propane dehydrator condenser, a butane dehydrator condenser, a propane condenser, an air-cooled condenser, a regeneration gas cooler, and a butane condenser, or combinations thereof. The natural gasoline processing processes or sections can include, but are not limited to, a natural gasoline (NG) flash vapor condenser, a NG de-colorizer condenser, or combinations thereof.

Fractionation Section

Fractionation is the process of separating the different components of natural gas. Separation is possible because each component has a different boiling point. At temperatures less than than the boiling point of a particular component, that component condenses to a liquid. It is also possible to increase the boiling point of a component by increasing the pressure. By using columns operating at different pressures and temperatures, the NGL fractionation plant is capable of separating ethane, propane, butane, pentane, or combinations thereof (with or without heavier associated hydrocarbons) from NGL fractionation feeds. De-ethanizing separates ethane from C2+ NGL, where C2 refers to a molecule containing two carbon atoms (ethane), and where C2+ refers to a mixture containing molecules having two or more carbon atoms, for example, a NGL containing C2, C3, C4, C5 can be abbreviated as "C2+ NGL". De-propanizing and de-butanizing separate propane and butane, respectively, from C3+ NGL and C4+NGL, respectively. Because the boiling points of heavier natural gases are closer to each other, such gases can be harder to separate compared to lighter natural gases. Also, a rate of separation of heavier components is less than that of comparatively lighter components. In some instances, the NGL fractionation plant can implement, for example, about 45 distillation trays in the de-ethanizer, about 50 trays in the de-propanizer, and about 55 trays in the de-butanizer.

The fractionation section can receive a feed gas containing C2+ NGL from gas plants, which are upstream plants that condition and sweeten the feed gas, and produce a sales gas, such as a C1/C2 mixture, where C1 is about 90%, as a final product. The C2+ NGL from gas plants can be further processed in the NGL fractionation plant for C2+ recovery. From feed metering or surge unit metering (or both), feed flows to the three fractionation modules, namely, the de-ethanizing module, the de-propanizing module and the de-butanizing module, each of which is described later.

De-Ethanizer Module (or De-Ethanizer Column)

The C2+ NGL is pre-heated before entering the de-ethanizer column for fractionation. The separated ethane leaves the column as overhead gas. The ethane gas is condensed by a closed-loop propane refrigeration system. After being cooled and condensed, the ethane is a mixture of gas and liquid. The liquid ethane is separated and pumped back to the top of the column as reflux. The ethane gas is warmed in an economizer and then sent to users. The bottoms product from the de-ethanizer reboiler is C3+ NGL, which is sent to the de-propanizer module.

De-Propanizer Module (or De-Propanizer Column)

From the de-ethanizer module, C3+ NGL enters the de-propanizer module for fractionation. The separated propane leaves the column as overhead gas. The gas is condensed using coolers. The propane condensate is collected in a reflux drum. Some of the liquid propane is pumped back to the column as reflux. The rest of the propane is either treated or sent to users as untreated product. The bottoms product from the depropanizer reboiler, C4+ is then sent to the de-butanizer module De-Butanizer Module (or De-Butanizer Column)

C4+ enters the de-butanizer module for fractionation. The separated butane leaves the column as overhead gas. The gas is condensed using coolers. The butane condensate is collected in a reflux drum. Some of the liquid butane is pumped back to the column as reflux. The rest of the butane is either treated or sent to users as untreated product. The bottoms product from the debutanizer reboiler, C5+ natural gas (NG) goes on to a RVP control section (which may also be referred to as a rerun unit), which will be discussed in greater detail in a later section.

Product Treating Section

While ethane requires no further treatment, propane and butane products are normally treated to remove hydrogen sulfide ($H_2S$), carbonyl sulfide (COS), and mercaptan sulfur (RSH). Then, the products are dried to remove any water. All exported product is treated, while untreated products can go to other industries. As described later, propane receives ADIP treating, MEROX™ (Honeywell UOP; Des Plaines, Ill.) treating, and dehydration. Butane receives MEROX treating, and dehydration.

ADIP Treating Section

ADIP is a solution of di-isopropanol amine and water. ADIP treating extracts $H_2S$ and COS from propane. The ADIP solution, through contact with the sour propane, absorbs the $H_2S$ and COS. The ADIP solution first contacts the sour propane in an extractor. In the extractor, the ADIP absorbs most of the $H_2S$ and some of the COS. The propane then passes through a mixer/settler train where the propane contacts with ADIP solution to extract more $H_2S$ and COS. This partially sweetened propane is cooled and then washed with water to recover the ADIP entrained with the propane. The propane is then sent to MEROX treating, which is described later. The rich ADIP that has absorbed the $H_2S$ and COS leaves the bottom of the extractor and is regenerated into lean ADIP for reuse. The regenerator column has a temperature and pressure that are suitable for acid gas removal. When the rich ADIP enters the regenerator, the entrained acid gases are stripped. As the acid gases leaves the regenerator as overhead, any free water is removed to prevent acid formation. The acid gases are then sent to flare. The lean ADIP leaves the extractor bottom and is cooled and filtered. Lean ADIP returns to the last mixer/settler and flows back through the system in the counter-current direction of the propane to improve contact between the propane and ADIP, which improves $H_2S$ and COS extraction.

C3/C4 MEROX Treating Section

MEROX treating removes mercaptan sulfur from C3/C4 product. Mercaptans are removed using a solution of sodium hydroxide (NaOH), also known by the commercial name caustic soda (hereinafter referred to as "caustic") and MEROX. The MEROX catalyst facilitates the oxidation of mercaptans to disulfides. The oxidation takes place in an alkaline environment, which is provided by using the caustic solution. MEROX treating for C3 and C4 is similar. Both products are prewashed with caustic to remove any remaining traces of $H_2S$, COS, and $CO_2$. This prevents damage to the caustic that is used in MEROX treating. After prewashing, product flows to an extractor, where a caustic solution with MEROX catalyst contacts with the product. The caustic/catalyst solution converts the mercaptans into mercaptides. The sweetened product, which is lean on acid gases, leaves the extractor as overhead and any remaining caustic is separated. Caustic leaves the bottom of both product extractors rich with mercaptides. The rich caustic is regenerated into lean caustic for reuse. The C3/C4 extraction sections share a common caustic regeneration section, namely, an oxidizer. Before entering the bottom of the oxidizer, the rich caustic is injected with MEROX catalyst to maintain proper catalyst concentration, heated, and mixed with process air. In the oxidizer, the mercaptides are oxidized into disulfides. The mixture of disulfides, caustic, and air leave the oxidizer as overhead. The air, disulfide gases, and disulfide oil are separated from the regenerated caustic. The regenerated caustic is pumped to the C3/C4 extractor. Regenerated caustic with any residual disulfides is washed with NG in the NG wash settler.

C3/C4 Dehydration Section

Propane or butane products (or both) contain water when they leave MEROX treating. Dehydration removes moisture in such products through adsorption before the products flow to refrigeration and storage. The dehydration processes for C3 and C4 are similar. Both C3/C4 dehydration sections have two de-hydrators containing molecular sieve desiccant beds. One de-hydrator is in service while the other undergoes regeneration. Regeneration consists of heating the sieve beds to remove moisture, then cooling the beds before reuse. During drying, product flows up and through the molecular sieve bed, which adsorbs (that is, binds to its surface) moisture. From the top of the de-hydrator, dry C3/C4 products flow to refrigeration.

Natural Gasoline (NG) Processing Section

NG processing includes RVP control, de-colorizing and de-pentanizing sections.

RVP Control Section

A Reid vapor pressure (RVP) control section (or rerun unit) is a fractionator column that receives the C5+NG from the debutanizer bottom. The RVP control section collects a pentane product. The RVP control section can be used to adjust the RVP of the pentane product at a rerun fractionator overhead before the pentane product is sent to a pentane storage tank. RVP is a measure of the ability of a hydrocarbon to vaporize. RVP (sometimes called volatility) is an important specification in gasoline blending. The RVP control section stabilizes the RVP of NG by removing small amounts of pentane. Depending on operational requirements, the RVP control section can be totally or partially bypassed. NG from the debutanizer bottoms goes to the RVP column where a controlled amount of pentane is stripped and leaves the column as overhead gas. As in NGL fractionation, the overhead gas is condensed with coolers, and some of the condensate is pumped back to the column as reflux. The remaining pentane is cooled and sent to storage. If the RVP column bottoms product (NG) meets color specifications, it is sent to storage. If not, it is sent to decolorizing.

De-Colorizing Section

The de-colorizing section removes color bodies from NG. Color bodies are traces of heavy ends found in the debutanizer bottoms product. Other impurities such as corrosion products from the pipeline may also be present. These must be removed for NG to meet the color specification. De-colorizer feed can be RVP column bottoms product or de-butanizer bottoms product, or a combination of both. Additional natural gasoline can also be supplied from other facilities to maintain a hexane plus (C6+) product supply. If de-colorizing is needed, NG first passes through a pre-flash-drum. A large portion of the lighter NG components vaporizes and leaves the drum as overhead. The heavier NG components remain along with the color bodies and are fed to the de-colorizer column, where the remaining color bodies are separated. The NG leaves the de-colorizer as overhead gas and is condensed and collected in the NG product drum, with some pumped back to the column as reflux. Overhead from the column and flash drum are joined and pumped to either the de-pentanizer (described later) or cooled and sent to storage in the feed product surge unit. The color bodies leave the de-colorizer as bottoms product and are pumped to the feed and surge unit to be injected into a crude line.

De-Pentanizing Section

De-pentanizing uses a fractionation column to produce a pentane overhead product and a C6+ bottoms product. Both the pentane product and the C6+ bottoms product are separately fed to storage or downstream the petrochemical plants. The feed to the de-pentanizer is the NG product stream from the de-colorizing section. Feed can be increased or decreased based on the demand for C6+ bottoms product. If the NGL fractionation plant NG production cannot meet demand, NG can be imported from oil refineries. The de-colorized NG is preheated before entering the de-pentanizer. The separated pentane leaves the column as overhead gas. The overhead condensers cool the overhead stream, and some is pumped back to the column as reflux. The remaining pentane is cooled and sent to storage. Light NG in the bottoms is vaporized and returned to heat the de-pentanizer. The remaining bottoms product is cooled and sent to storage as C6+.

Table 2 lists duty per train of major waste heat streams in an example of an NGL fractionation plant.

TABLE 2

| Stream Name | Duty/train (MMBtu/h) |
| --- | --- |
| Propane refrigerant condenser | 94 |
| Propane de-hydration condenser | 22 |
| Butane de-hydrator condenser | 9 |
| Naphtha cooler | 11 |
| De-pentanizer condenser | 100 |
| ADIP cooler | 73 |
| Regenerator OVHD condenser | 18 |
| NG flash vapor condenser | 107 |
| NG de-colorizer condenser | 53 |
| Natural gasoline (cooling) process propane condenser | 29 |
| Fractionation propane condenser | 81 |
| Air cooled condenser | 16 |
| Regeneration gas cooler | 22 |
| RVP column condenser | 36 |
| Butane condenser | 49 |
| De-propanizer condenser | 194 |
| De-butanizer condenser | 115 |

In Table 2, "Duty/train" represents each stream's thermal duty in millions Btu per hour (MMBtu/h) per processing train. A typical NGL fractionation plant includes three to four processing trains.

The systems described in this disclosure can be integrated with a NGL fractionation plant to make the fractionation plant more energy efficient or less polluting or both. In particular, the energy conversion system can be implemented to recover low grade waste heat from the NGL fractionation plant. Low grade waste heat is characterized by a temperature difference between a source and sink of the low grade heat steam being between 65° C. and 232° C. (150° F. and 450° F.). The NGL fractionation plant is an attractive option for integration with energy conversion systems due to a large amount of low grade waste heat generated by the plant and an absence of a need for deep cooling. Deep cooling refers to a temperature that is less than ambient that uses a refrigeration cycle to maintain.

The low grade waste heat from an NGL fractionation plant can be used for commodities such as carbon-free power generation, cooling capacity generation, potable water production from sea water, or combinations thereof. Low grade waste heat is characterized by a temperature ranging between 65° C. and 232° C. (150° F. to 450° F.). The waste heat can be used for the mono-generation, co-generation, or tri-generation of one or more or all of the commodities mentioned earlier. Low grade waste heat from the NGL fractionation plant can be used to provide in-plant sub-ambient cooling, thus reducing the consumption of power or fuel (or both) of the plant. Low grade waste heat from the NGL fractionation plant can be used to provide ambient air conditioning or cooling in the industrial community or in a nearby non-industrial community, thus helping the community to consume energy from alternative sources. In addition, the low grade waste heat can be used to desalinate water and produce potable water to the plant and adjacent community. An NGL fractionation plant is selected for low grade waste heat recovery because of a quantity of low grade waste heat available from the NGL fractionation plant as well as a cooling requirement of the plant to ambient temperature cooling (instead of deep cooling).

The energy conversion systems described in this disclosure can be integrated into an existing NGL fractionation plant as a retrofit or can be part of a newly constructed NGL fractionation plant. A retrofit to an existing NGL fractionation plant allows the carbon-free power generation, and fuel savings advantages offered by the energy conversion systems described here to be accessible with a reduced capital investment. For example, the energy conversion systems described here can produce one or more or all of substantially between 35 MW and 40 MW (for example, 37 MW) of carbon-free power, substantially between 100,000 and 150,000 m$^3$/day (for example, 120,000 m$^3$/day) of desalinated water, and substantially between 350 MM BTU/h and 400 MM BTU/h (for example, 388 MM BTU/h) of cooling capacity for in-plant or community utilization or both.

As described later, the systems for waste heat recovery and re-use from the NGL fractionation plant can include modified multi-effect distillation (MED) systems, customized Organic Rankine Cycle (ORC) systems, unique ammonia-water mixture Kalina cycle systems, customized modified Goswami cycle systems, mono-refrigerant specific vapor compression-ejector-expander triple cycle systems, or combinations of one or more of them. Details of each disclosure are described in the following paragraphs.

Heat Exchangers

In the configurations described in this disclosure, heat exchangers are used to transfer heat from one medium (for example, a stream flowing through a plant in a NGL fractionation plant, a buffer fluid or such medium) to another medium (for example, a buffer fluid or different stream flowing through a plant in the NGL fractionation plant). Heat exchangers are devices which transfer (exchange) heat typically from a hotter fluid stream to a relatively less hotter fluid stream. Heat exchangers can be used in heating and cooling applications, for example, in refrigerators, air conditions or such cooling applications. Heat exchangers can be distinguished from one another based on the direction in which fluids flow. For example, heat exchangers can be parallel-flow, cross-flow or counter-current. In parallel-flow heat exchangers, both fluid involved move in the same direction, entering and exiting the heat exchanger side-by-side. In cross-flow heat exchangers, the fluid path runs perpendicular to one another. In counter-current heat exchangers, the fluid paths flow in opposite directions, with one fluid exiting whether the other fluid enters. Counter-current heat exchangers are sometimes more effective than the other types of heat exchangers.

In addition to classifying heat exchangers based on fluid direction, heat exchangers can also be classified based on their construction. Some heat exchangers are constructed of multiple tubes. Some heat exchangers include plates with room for fluid to flow in between. Some heat exchangers enable heat exchange from liquid to liquid, while some heat exchangers enable heat exchange using other media.

Heat exchangers in a NGL fractionation plant are often shell and tube type heat exchangers which include multiple tubes through which fluid flows. The tubes are divided into two sets—the first set contains the fluid to be heated or cooled; the second set contains the fluid responsible for triggering the heat exchange, in other words, the fluid that either removes heat from the first set of tubes by absorbing and transmitting the heat away or warms the first set by transmitting its own heat to the fluid inside. When designing this type of exchanger, care must be taken in determining the correct tube wall thickness as well as tube diameter, to allow optimum heat exchange. In terms of flow, shell and tube heat exchangers can assume any of three flow path patterns.

Heat exchangers in NGL facilities can also be plate and frame type heat exchangers. Plate heat exchangers include thin plates joined together with a small amount of space in between, often maintained by a rubber gasket. The surface area is large, and the corners of each rectangular plate feature an opening through which fluid can flow between plates, extracting heat from the plates as it flows. The fluid channels themselves alternate hot and cold liquids, meaning that the heat exchangers can effectively cool as well as heat fluid. Because plate heat exchangers have large surface area, they can sometimes be more effective than shell and tube heat exchangers.

Other types of heat exchangers can include regenerative heat exchangers and adiabatic wheel heat exchangers. In a regenerative heat exchanger, the same fluid is passed along both sides of the exchanger, which can be either a plate heat exchanger or a shell and tube heat exchanger. Because the fluid can get very hot, the exiting fluid is used to warm the incoming fluid, maintaining a near constant temperature. Energy is saved in a regenerative heat exchanger because the process is cyclical, with almost all relative heat being transferred from the exiting fluid to the incoming fluid. To maintain a constant temperature, a small quantity of extra energy is needed to raise and lower the overall fluid temperature. In the adiabatic wheel heat exchanger, an intermediate liquid is used to store heat, which is then transferred to the opposite side of the heat exchanger. An adiabatic wheel consists of a large wheel with threads that rotate through the liquids—both hot and cold—to extract or transfer heat. The heat exchangers described in this disclosure can include any one of the heat exchangers described earlier, other heat exchangers, or combinations of them.

Each heat exchanger in each configuration can be associated with a respective thermal duty (or heat duty). The thermal duty of a heat exchanger can be defined as an amount of heat that can be transferred by the heat exchanger from the hot stream to the cold stream. The amount of heat can be calculated from the conditions and thermal properties of both the hot and cold streams. From the hot stream point of view, the thermal duty of the heat exchanger is the product of the hot stream flow rate, the hot stream specific heat, and a difference in temperature between the hot stream inlet temperature to the heat exchanger and the hot stream outlet temperature from the heat exchanger. From the cold stream point of view, the thermal duty of the heat exchanger is the product of the cold stream flow rate, the cold stream specific heat and a difference in temperature between the cold stream outlet from the heat exchanger and the cold stream inlet temperature from the heat exchanger. In several applications, the two quantities can be considered equal assuming no heat loss to the environment for these units, particularly, where the units are well insulated. The thermal duty of a heat exchanger can be measured in watts (W), megawatts (MW), millions of British Thermal Units per hour (Btu/hr), or millions of kilocalories per hour (Kcal/h). In the configurations described here, the thermal duties of the heat exchangers are provided as being "about X MW," where "X" represents a numerical thermal duty value. The numerical thermal duty value is not absolute. That is, the actual thermal duty of a heat exchanger can be approximately equal to X, greater than X or less than X.

Flow Control System

In each of the configurations described later, process streams (also called "streams") are flowed within each plant in a NGL fractionation plant and between plants in the NGL fractionation plant. The process streams can be flowed using one or more flow control systems implemented throughout the NGL fractionation plant. A flow control system can include one or more flow pumps to pump the process streams, one or more flow pipes through which the process streams are flowed and one or more valves to regulate the flow of streams through the pipes.

In some implementations, a flow control system can be operated manually. For example, an operator can set a flow rate for each pump and set valve open or close positions to regulate the flow of the process streams through the pipes in the flow control system. Once the operator has set the flow rates and the valve open or close positions for all flow control systems distributed across the NGL fractionation plant, the flow control system can flow the streams within a plant or between plants under constant flow conditions, for example, constant volumetric rate or such flow conditions. To change the flow conditions, the operator can manually operate the flow control system, for example, by changing the pump flow rate or the valve open or close position.

In some implementations, a flow control system can be operated automatically. For example, the flow control system can be connected to a computer system to operate the flow control system. The computer system can include a computer-readable medium storing instructions (such as flow control instructions and other instructions) executable by one or more processors to perform operations (such as flow control operations). An operator can set the flow rates and the valve open or close positions for all flow control systems distributed across the NGL fractionation plant using the computer system. In such implementations, the operator can manually change the flow conditions by providing inputs through the computer system. Also, in such implementations, the computer system can automatically (that is, without manual intervention) control one or more of the flow control systems, for example, using feedback systems implemented in one or more plants and connected to the computer system. For example, a sensor (such as a pressure sensor, temperature sensor or other sensor) can be connected to a pipe through which a process stream flows. The sensor can monitor and provide a flow condition (such as a pressure, temperature, or other flow condition) of the process stream to the computer system. In response to the flow condition exceeding a threshold (such as a threshold pressure value, a threshold temperature value, or other threshold value), the computer system can automatically perform operations. For example, if the pressure or temperature in the pipe exceeds the threshold pressure value or the threshold temperature value, respectively, the computer system can provide a signal to the pump to decrease a flow rate, a signal to open a valve to relieve the pressure, a signal to shut down process stream flow, or other signals.

In some examples, waste heat from a natural gas liquid fractionation plant can be recovered from a network of one or more heat exchangers located in the natural gas liquid fractionation plant. The waste heat recovered by the heat exchangers can be used to power a Kalina cycle based waste heat to power conversion plant. A Kalina cycle is an energy conversion system that uses a mixture of ammonia and water in a closed loop arrangement. For instance, the Kalina cycle based waste heat to power conversion plant can produce at least 40 MW of power, such as between about 40 MW and about 50 MW of power, such as about 40 MW, about 45 MW, or about 50 MW.

FIG. 1A is a schematic diagram of an example of a low grade waste heat recovery system. The schematic includes a storage tank 401 to store buffer fluid, for example, oil, pressurized water, or other buffer fluid. The buffer fluid from the storage tank 401 is flowed to a heat exchanger network 499 which, in some implementations, can include 17 heat exchangers (for example, heat exchangers 402a, 402b, 402c, 402d, 402e, 402f, 402g, 402h, 402i, 402j, 402k, 402l, 402m, 402n, 402o, 402p, 402q), which are described in detail later. The buffer fluid is flowed through the heat exchanger network 499 and heated by streams in the NGL fractionation plant (described later). As described later, the heated buffer fluid from the storage tank 401 is used to generate power and sub-ambient cooling capacity in a Kalina cycle system 405. The buffer fluid is then returned to the storage tank 401.

Figure 1B:
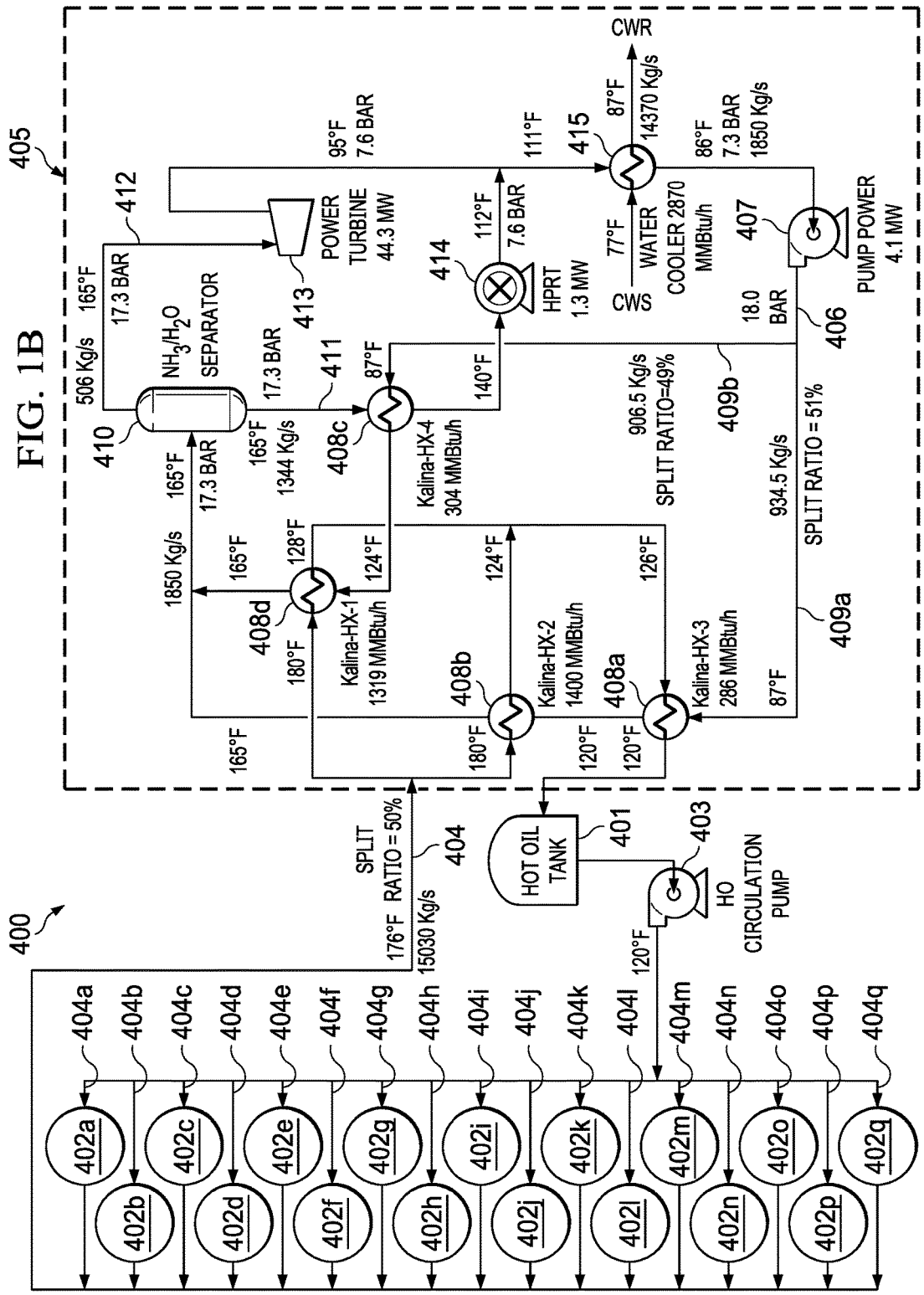
FIG. 1B is a diagram of a Kalina cycle based waste heat to power conversion plant.

Referring to FIG. 1B, a Kalina cycle based plant 400 includes the storage tank 401 that stores buffer fluid 404, such as oil, water, an organic fluid, or another buffer fluid. The buffer fluid 404 is pumped from the storage tank 401 to the heat exchanger network 499 (FIG. 1A) including the heat exchangers 402a-402q in the natural gas liquid fractionation plant by a buffer fluid circulation pump 403. For instance, the buffer fluid 404 in the storage tank 401 can be at a temperature of between about 110° F. and about 130° F., such as about 110° F., about 120° F., or about 130° F.

Individual streams of buffer fluid 404a-404q are heated in each of the heat exchangers 402a-402q by recovery of waste heat from process streams in the natural gas liquid fractionation plant. The heat exchangers 402a-402q can be configured such that they are parallel to one another in relation to the flow of the buffer fluid 404a-404q. The heated streams of buffer fluid 404a-404q are joined into a single header of hot buffer fluid 404 downstream of the heat exchangers 402a-402q. The hot buffer fluid 404 can be at a temperature of, for example, between about 170° F. and about 190° F., such as about 170° F., about 180° F., or about 190° F. The hot buffer fluid 404 can flow at a rate of between about 15,000 kg/s and about 17,000 kg/s, such as about 15,000 kg/s, about 16,000 kg/s, or about 17,000 kg/s.

The heat from the hot buffer fluid 404 is used to heat a working fluid 406, such as an ammonia-water mixture, in the Kalina cycle system 405, which in turn is used to power turbines, thus generating power from the waste heat recovered from the natural gas liquid fractionation plant. For instance, the plant 400 can produce at least 40 MW of power, such as between about 40 MW and about 50 MW of power, such as about 40 MW, about 45 MW, or about 50 MW.

The Kalina cycle system 405 includes a pump 407. The pump 407 can consume, for instance, between about 3.5 MW and about 4.5 MW of power, such as about 3.5 MW, about 4 MW, or about 4.5 MW. The pump 407 can pump the working fluid 406 from a starting pressure of, for instance, between about 7 Bar and about 8 Bar, such as about 7 Bar, about 7.5 Bar, or about 8 Bar; to a higher pressure of, for instance, between about 16 Bar and about 20 Bar, such as about 16 Bar, about 18 Bar, or about 20 Bar. The pump 407 can be sized to receive the ammonia-water mixture 406 at a flow rate of between about 1500 kg/s and about 2500 kg/s, such as about 1500 kg/s, about 2000 kg/s, or about 2500 kg/s.

The working fluid 406 can be a mixture of ammonia and water, for instance, between 65% and about 75% ammonia, such as about 65%, about 70%, or about 75%; and between about 25% and about 35% water, such as about 25%, about 30%, or about 35%. The working fluid 406 is pumped by the pump 407 into a network of heat exchangers 408a, 408b, 408d that together achieve partial evaporation of the working fluid 406 using heat from the buffer fluid 404, directly or indirectly. The heat exchangers are divided into two parallel branches: a first branch including the heat exchangers 408a and 408b, and the second branch including a heat exchanger 408c and the heat exchanger 408d. The working fluid 406 flowing along the two branches is heated and partially vaporized using between about 2500 MM Btu/h and about 3500 MM Btu/h, such as about 2500 MM Btu/h, about 3000 MM Btu/h, or about 3500 MM Btu/h, of waste heat collected by the buffer fluid; and using between about 200 MM Btu/h and about 400 MM Btu/h, such as about 200 MM Btu/h, about 300 MM Btu/h, or about 400 MM Btu/h, of heat from a bottoms stream of a Kalina cycle separator (the liquid vapor separator 410, such as an ammonia-water separator).

The first branch of heat exchangers 408a and 408b is in a parallel configuration with the second branch of the heat exchangers 408c and 408d in relation to the flow of the working fluid 406. Within each branch, the two heat exchangers are arranged in series in relation to the flow of the working fluid 406, such that the heat exchanger 408a is in series with the heat exchanger 408b and the heat exchanger 408c is in series with the heat exchanger 408d. With respect to the flow of the buffer fluid 404, the heat exchanger 408b is in a parallel configuration with the heat exchanger 408d, and the parallel heat exchangers 408b and 408d are in series with the heat exchanger 408a.

The heat exchanger 408a can have a thermal duty of, for instance, between about 250 MM Btu/h and about 350 MM Btu/h, such as about 250 MM Btu/h, about 275 MM Btu/h, about 300 MM Btu/h, about 325 MM Btu/h, or about 350 MM Btu/h. The heat exchanger 408b can have a thermal duty of, for instance, between about 1300 MM Btu/h and about 1500 MM Btu/h, such as about 1300 MM Btu/h, about 1400 MM Btu/h, or about 1500 MM Btu/h. The heat exchanger 408c can have a thermal duty of, for instance, between about 250 MM Btu/h and about 350 MM Btu/h, such as about 250 MM Btu/h, about 275 MM Btu/h, about 300 MM Btu/h, about 325 MM Btu/h, or about 350 MM Btu/h. The heat exchanger 408d can have a thermal duty of, for instance, between about 1200 MM Btu/h and about 1400 MM Btu/h, such as about 1200 MM Btu/h, about 1300 MM Btu/h, or about 1400 MM Btu/h. The buffer fluid 404, flowing through the network of heat exchangers 408a, 408b, 408d, cools and returns to the storage tank 401.

The working fluid 406 exiting the pump 407 can have a temperature of, for instance, between about 80° F. and about 100° F., such as about 80° F., about 90° F., or about 100° F. The working fluid 406 from the pump 407 is split into two portions, for instance, with a split ratio of about between about 48% and about 52%, such as about 48%, about 50%, or about 52%.

A first portion 409a of the working fluid 406 from the pump 407 is pre-heated and partially vaporized by exchange with the buffer fluid 404 in the heat exchangers 408a and 408b, which are in series in relation to the working fluid flow. For instance, the first portion 409a of the working fluid 406 is heated to a temperature of between about 160° F. and about 180° F., such as about 160° F., about 170° F., or about 180° F.

A second portion 409b of the working fluid 406 from the pump 407 is pre-heated and partially vaporized by exchange with a liquid stream 411 (from a liquid-vapor separator 410, described in the following paragraphs) in the heat exchanger 408c. For instance, the second portion 409b is heated to a temperature of between about 120° F. and about 140° F., such as about 120° F., about 130° F., or about 140° F. The heated second portion 409b is further heated and partially vaporized by exchange with the buffer fluid 404 in the heat exchanger 408d, which is in series in relation to the working fluid flow with the heat exchanger 408c. For instance, the second portion 409b is heated to a temperature of between about 160° F. and about 180° F., such as about 160° F., about 170° F., or about 180° F.

The first and second portions 409a, 409b of the working fluid, which are heated and partially vaporized, flow into the liquid-vapor separator 410 that separates liquid from vapor, such as liquid ammonia and water from ammonia-water vapor. The pressure of the working fluid upon entry into the liquid-vapor separator 410 can be, for instance, between about 16 Bar and about 18 Bar, such as about 16 Bar, about 17 Bar, or about 18 Bar. A liquid stream 411 of the working fluid, such as liquid ammonia and water, which is a lean stream, exits the bottom of the separator 410 and a vapor stream 412 of the working fluid, such as ammonia-water vapor, exits the top of the separator 410.

The vapor stream 412, which is a rich stream, flows to a turbine 413 that (in combination with a generator, not shown) can generate power. For instance, the turbine 413 can generate at least about 40 MW of power, such as between about 40 MW and about 50 MW of power. Power is generated by the turbine 413 using a flow rate of the vapor stream 412 of between about 450 kg/s and about 550 kg/s, such as about 450 kg/s, about 500 kg/s, or about 550 kg/s. The turbine 413 reduces the pressure of the stream 412 to, for instance, between about 7 Bar and about 8 Bar, such as about 7 Bar, about 7.5 Bar, or about 8 Bar; and reduces the temperature of the stream 412 to, for instance, between about 90° F. and about 110° F., such as about 90° F., about 100° F., or about 110° F.

The liquid stream 411 flows via the heat exchanger 408c to a high pressure recovery turbine (HPRT) 414, for example, a hydraulic liquid turbine, for additional power generation. After exchange at the heat exchanger 408c, the temperature of the liquid stream 411 is between about 130° F. and about 150° F., such as about 130° F., about 140° F., or about 150° F. The HPRT 414 can generate at least about 1 MW of power, such as between about 1 MW and about 2 MW of power, such as about 1 MW, about 1.5 MW, or about 2 MW of power. Power is generated by the HPRT 414 using a flow rate of the liquid stream 411 of between about 1000 kg/s and about 1500 kg/s, such as about 1000 kg/s, about 1100 kg/s, about 1200 kg/s, about 1300 kg/s, about 1400 kg/s, or about 1500 kg/s. The HPRT 414 reduces the pressure of the liquid stream 411 to, for instance, between about 7 Bar and about 8 Bar, such as about 7 Bar, about 7.5 Bar, or about 8 Bar; and reduces the temperature of the liquid stream 411 to, for instance, between about 100° F. and about 120° F., such as about 100° F., about 110° F., or about 120° F.

The vapor stream 412 and the liquid stream 411 combine into a single stream of the working fluid water mixture 406 after exiting the turbines 413, 414. The working fluid 406 is cooled in a cooler 415, such as a cooling water condenser or an air cooler, by exchange with cooling water. The cooler 415 can have a thermal duty of, for example, between about 2500 MM Btu/h and about 3500 MM Btu/h, such as about 2500 MM Btu/h, about 3000 MM Btu/h, or about 3500 MM Btu/h. The cooler 415 cools the working fluid 406 to a temperature of, for example, between about 80° F. and about 100° F., such as about 80° F., about 90° F., or about 100° F. The cooling water used to cool the working fluid 406 can have a temperature of between about 70° F. and about 90° F., such as about 70° F., about 80° F., or about 90° F.; and can be heated to a temperature of between about 80° F. and about 100° F., such as about 80° F., about 90° F., or about 100° F. In some examples, the temperature of the cooling water can vary depending on the season. For instance, the cooling water can have a lower temperature in winter than in summer. The volume of cooling water flowing through the cooler 415 can be between about 13,000 kg/s and about 15,000 kg/s, such as about 13,000 kg/s, about 14,000 kg/s, or about 15,000 kg/s.

Using a Kalina cycle for waste heat to power conversion can offer advantages. A Kalina cycle offers a degree of freedom in that the composition of the working fluid can be adjusted. This degree of freedom allows a Kalina cycle to be adapted to particular operating conditions, for example, to a particular heat source or a particular cooling fluid, in order to improve or optimize energy conversion and heat transfer. Furthermore, because ammonia has a similar molecular weight as water, ammonia-water vapor as a working fluid behaves similarly to steam, thus permitting the use of standard steam turbine components. At the same time, the use of a binary fluid allows the composition of the fluid to be varied throughout the cycle, for example, to provide a richer composition at the evaporator and a leaner composition at the condenser. In addition, ammonia is an environmentally friendly compound that is less hazardous than compounds, such as iso-butane, that are often used in other power conversion cycles.

The heat exchangers 402a-402q can be incorporated into various sections of a natural gas liquid fractionation plant to recover waste heat from liquid or vapor streams in those sections.

Figure 1C:
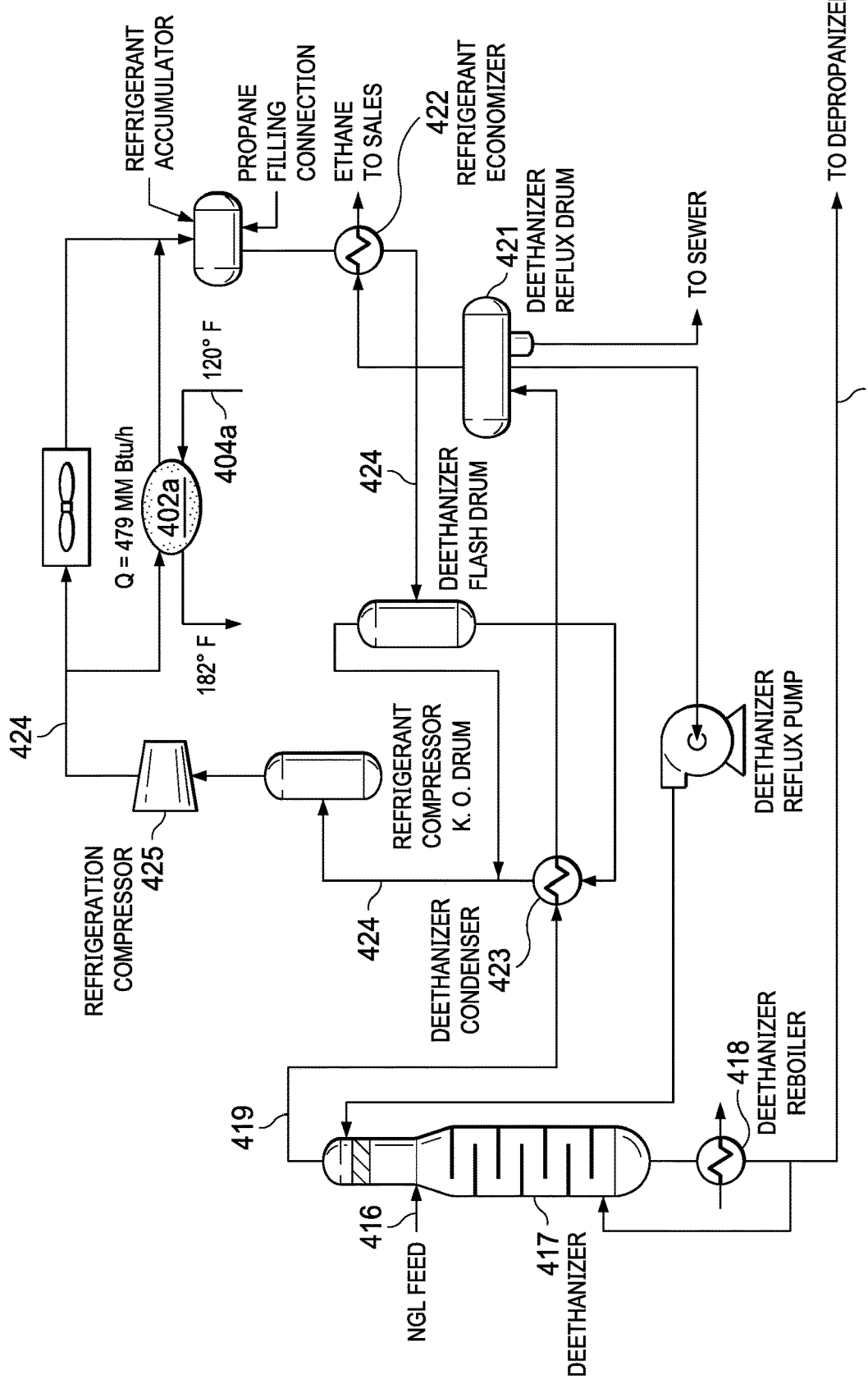
FIG. 1C is a diagram of a deethanizer section of a NGL fractionation plant.

Referring to FIG. 1C, in a deethanizer section of the natural gas liquid fractionation plant, a feed stream 416 of natural gas liquid is received into a deethanizer 417. A bottoms stream from the deethanizer 417 is processed in a reboiler 418, for instance, with heat provided by steam. Liquid ethane from the reboiler 418 is returned to the deethanizer 417 and C3+ NGL bottoms 420 from the deethanizer 417 are provided to a depropanizer 426 (FIG. 1C).

A top stream 419 of ethane gas from the deethanizer 417 is condensed in a condenser 423 and provided to a reflux drum 421. A top stream of ethane gas from the reflux drum 421 is warmed in a refrigerant economizer 422 and output, for instance, for sales. A bottoms stream of liquid ethane from the reflux drum 421 is returned to the deethanizer 417.

The condensation of ethane gas in the condenser 423 and the warming of ethane gas in the refrigerant economizer 422 is achieved by exchange with a refrigerant 424, such as propane, in a closed-loop refrigeration system. The refrigerant 424 warms as it absorbs heat from the ethane gas in the condenser 421. The warmed refrigerant 424 is then compressed in a refrigeration compressor 425. The compressed refrigerant 424 output from the refrigeration compressor 425 is cooled in the heat exchanger 402a by exchange with the stream 404a of buffer fluid. The presence of the heat exchanger 402a recovers waste heat from the refrigerant 424, and enables other components (for instance, cooling units or condensers) that would have been used to cool the refrigerant 424 to be bypassed or eliminated from the deethanizer section.

The stream 404a of buffer fluid can be heated from a temperature of between about 115° F. and 125° F. (for example, about 120° F.) to a temperature of between about 180° F. and about 190° F., (for example, about 182° F.). The thermal duty of the heat exchanger 402a can be between about 400 MM Btu/h and about 500 MM Btu/h, such as about 400 MM Btu/h, about 425 MM Btu/h, about 450 MM Btu/h, about 475 MM Btu/h, or about 500 MM Btu/h.

Figure 1D:
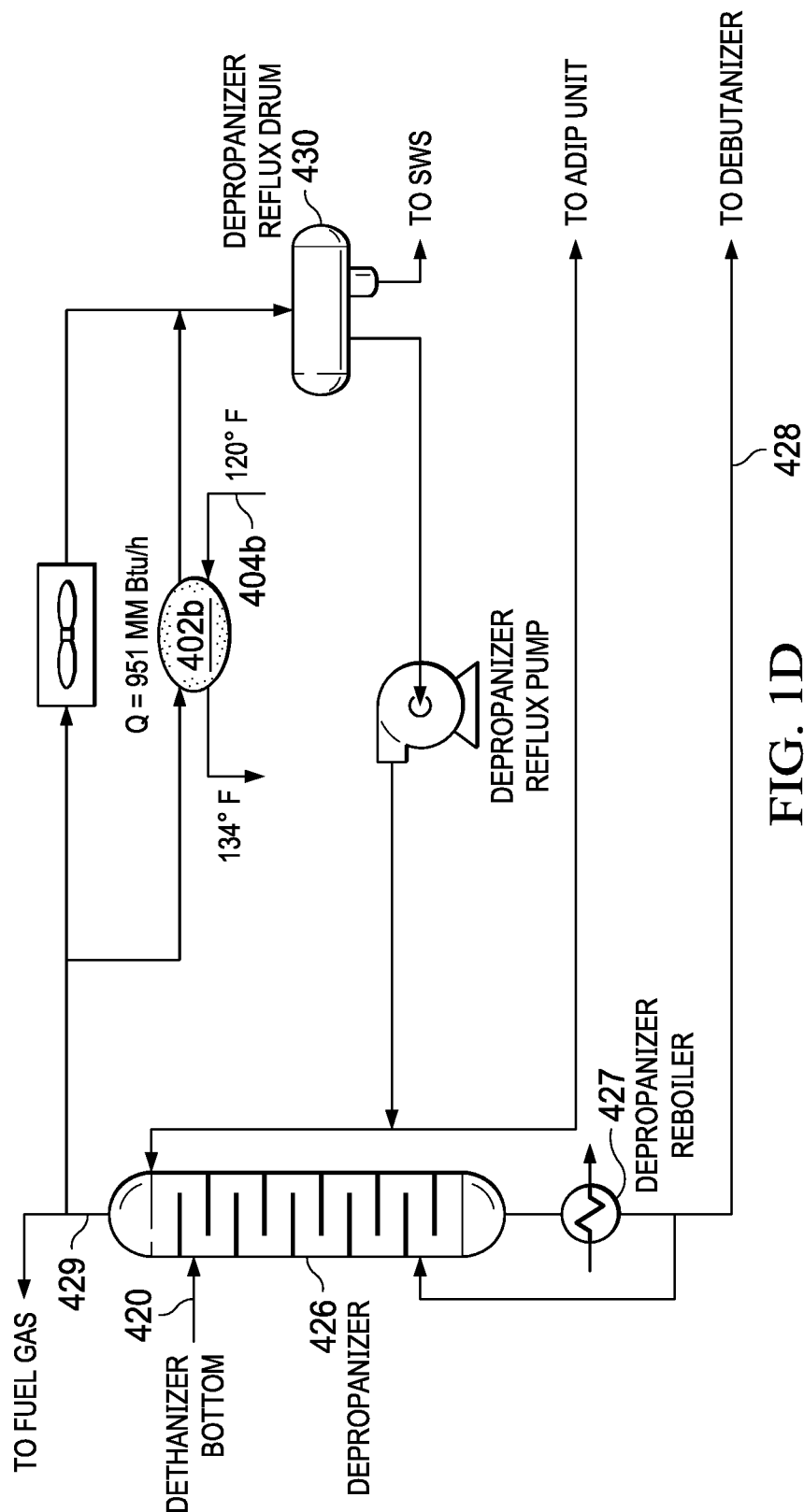
FIG. 1D is a diagram of a depropanizer section of a NGL fractionation plant.

Referring to FIG. 1D, in a depropanizer section of the natural gas liquid fractionation plant, the C3+ NGL bottoms stream 420 from the deethanizer 417 (FIG. 1C) are received into a depropanizer 426. A bottoms stream from the depropanizer 426 is processed in a reboiler 427, for instance, with heat provided by steam. Liquid propane from the reboiler 427 is returned to the depropanizer 426 and a C4+ NGL bottoms product 428 from the depropanizer 426 are provided to a debutanizer 435 (FIG. 1F).

Propane gas 429 exits from the top of the depropanizer 426 and is cooled in the heat exchanger 402b by exchange with the stream 404b of buffer fluid. The cooled propane gas 429 is collected in a reflux drum 430. A portion of the liquid propane from the reflux drum 430 is returned to the depropanizer 426, and a portion of the liquid propane from the reflux drum 430 is either treated (for instance, in an ADIP unit) or sent to users as untreated product. The presence of the heat exchanger 420b recovers waste heat from the propane gas 429, enabling other components (for instance, cooling units or condensers) that would have been used to cool the propane gas 429 to be bypassed or eliminated from the depropanizer section.

The stream 404b of buffer fluid can be heated from a temperature of between about 115° F. and about 125° F. (for example, about 120° F.) to a temperature of between about 130° F. and about 140° F., (for example, about 134° F.). The thermal duty of the heat exchanger 402b can be between about 900 MM Btu/h and about 1000 MM Btu/h, such as about 900 MM Btu/h, about 925 MM Btu/h, about 950 MM Btu/h, about 975 MM Btu/h, or about 1000 MM Btu/h.

Figure 1E:
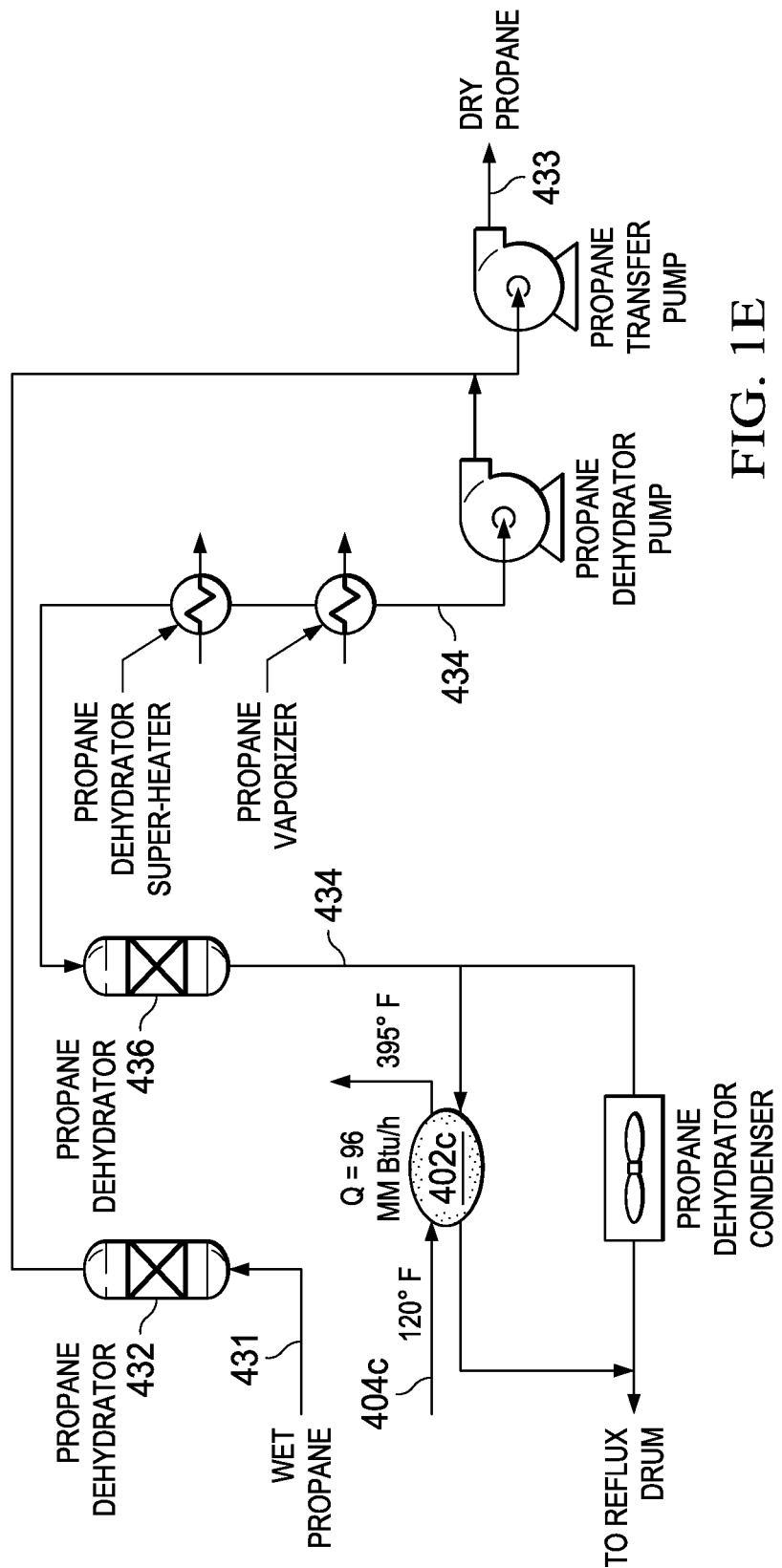
FIG. 1E is a diagram of a propane dehydrator section of a NGL fractionation plant.
Figure 1F:
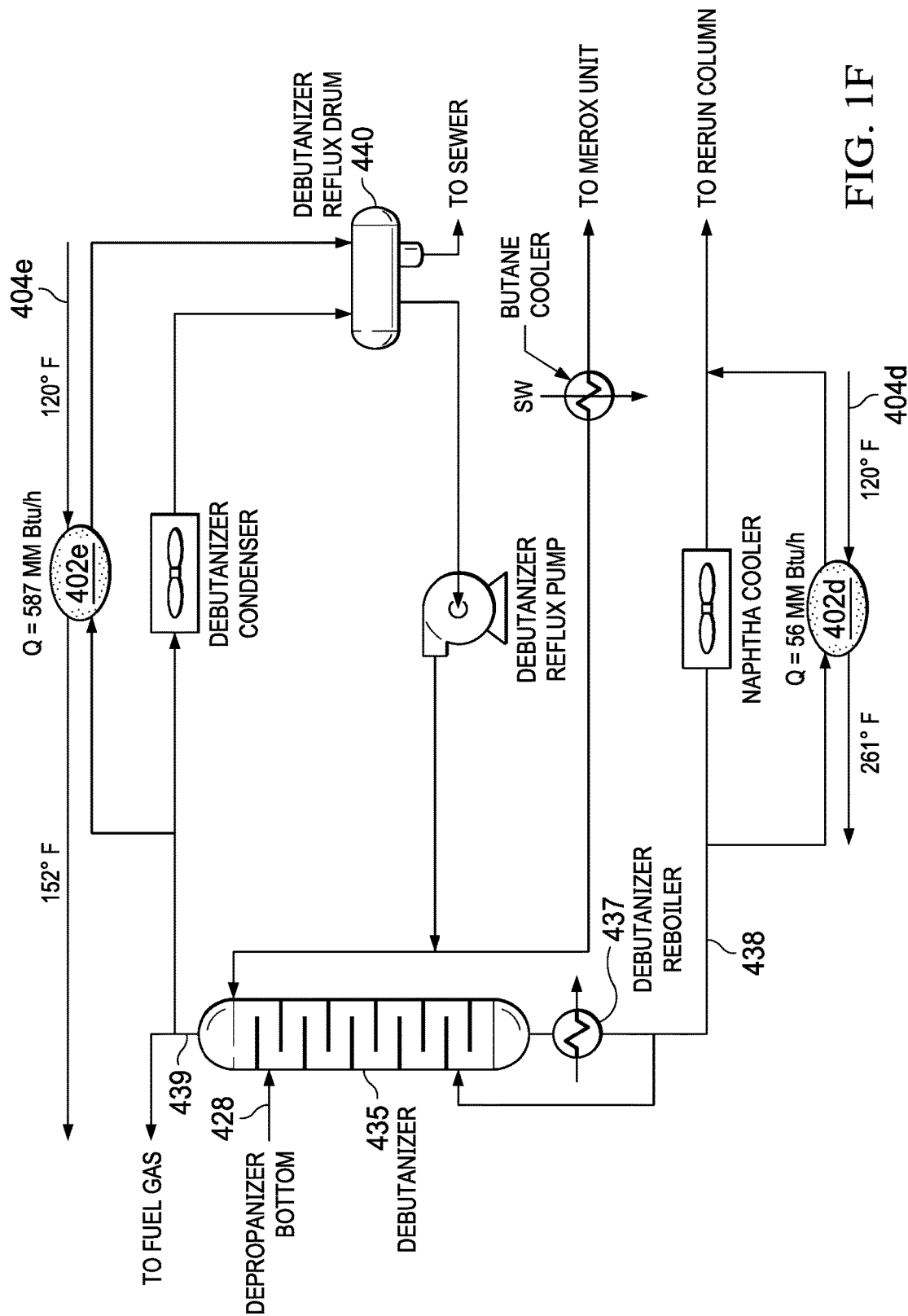
FIG. 1F is a diagram of a debutanizer section of a NGL fractionation plant.

Referring to FIG. 1E, in a propane dehydrator section of the natural gas liquid fractionation plant, wet propane 431 is dehydrated in a propane dehydrator 432. The wet propane 431 can be, for instance, the propane gas 429 in the depropanizer section (FIG. 1D). A portion 433 of the dry propane from the propane dehydrator 432 is output as dry propane, for instance, to a propane refrigeration section (FIG. 1L). Another portion 434 of the propane from the propane dehydrator 432 is further dehydrated in a propane dehydrator 436. The dry propane 434 output from the propane dehydrator 436 is cooled in the heat exchanger 402c by exchange with the stream 404c of buffer fluid. The cooled dry propane 434 is returned to the depropanizer reflux drum 430 (FIG. 1D). The presence of the heat exchanger 402c recovers waste heat from the dry propane 434, enabling other components (for instance, cooling units or condensers) that would have been used to cool the dry propane 434 to be bypassed or eliminated from the propane dehydrator section.

The stream 404c of buffer fluid can be heated from a temperature of between about 115° F. and 125° F. (for example, about 120° F.) to a temperature of between about 390° F. and about 400° F. (for example, about 395° F.). The thermal duty of the heat exchanger 402c can be between about 50 MM Btu/h and about 150 MM Btu/h, such as about 50 MM Btu/h, about 75 MM Btu/h, about 100 MM Btu/h, about 125 MM Btu/h, or about 150 MM Btu/h.

Referring to FIG. 1F, in a debutanizer section of the natural gas liquid fractionation plant, the C4+ NGL bottoms product 428 from the depropanizer 426 (FIG. 1D) are received into a debutanizer 435. A bottoms stream from the debutanizer 435 is processed in a reboiler 437, for instance, with heat provided by steam. Liquid butane from the reboiler is returned to the debutanizer 435. A C5+ bottoms product 438 from the debutanizer 435 is cooled in the heat exchanger 402d by exchange with the stream 404d of buffer fluid. The cooled C5+ bottoms product 438 is provided to a rerun unit (FIG. 1P). The presence of the heat exchanger 402d recovers waste heat from the C5+ bottoms product 438, enabling other components (for instance, a naphtha cooling unit) that would have been used to cool the C5+ bottoms product 438 to be bypassed or eliminated from the debutanizer section.

The stream 402d of buffer fluid can be heated from a temperature of between about 115° F. and 125° F. (for example, about 120° F.) to a temperature of between about 255° F. and about 265° F. (for example, about 261° F.). The thermal duty of the heat exchanger 402d can be between about 25 MM Btu/h and about 125 MM Btu/h, such as about 25 MM Btu/h, about 50 MM Btu/h, about 75 MM Btu/h, about 100 MM Btu/h, or about 125 MM Btu/h.

Butane gas 439 exits from the top of the debutanizer 435 and is cooled in the heat exchanger 402e by exchange with the stream 404e of buffer fluid. The cooled butane gas 439 is collected in a reflux drum 440. A portion of the liquid butane from the reflux drum is returned to the debutanizer 435, and a portion of the liquid butane from the reflux drum 440 is either treated (for instance, in a MEROX unit) or sent to users as untreated product. The presence of the heat exchanger 402e recovers waste heat from the butane gas 439, enabling other components (for instance, cooling units or condensers) that would have been used to cool the butane gas 439 to be bypassed or eliminated from the debutanizer section.

The stream 404e of buffer fluid can be heated from a temperature of between about 115° F. and 125° F. (for example, about 120° F.) to a temperature of between about 145° F. and about 155° F. (for example, about 152° F.). The thermal duty of the heat exchanger 402e can be between about 550 MM Btu/h and about 650 MM Btu/h, such as about 550 MM Btu/h, about 575 MM Btu/h, about 600 MM Btu/h, about 625 MM Btu/h, or about 650 MM Btu/h.

Figure 1G:
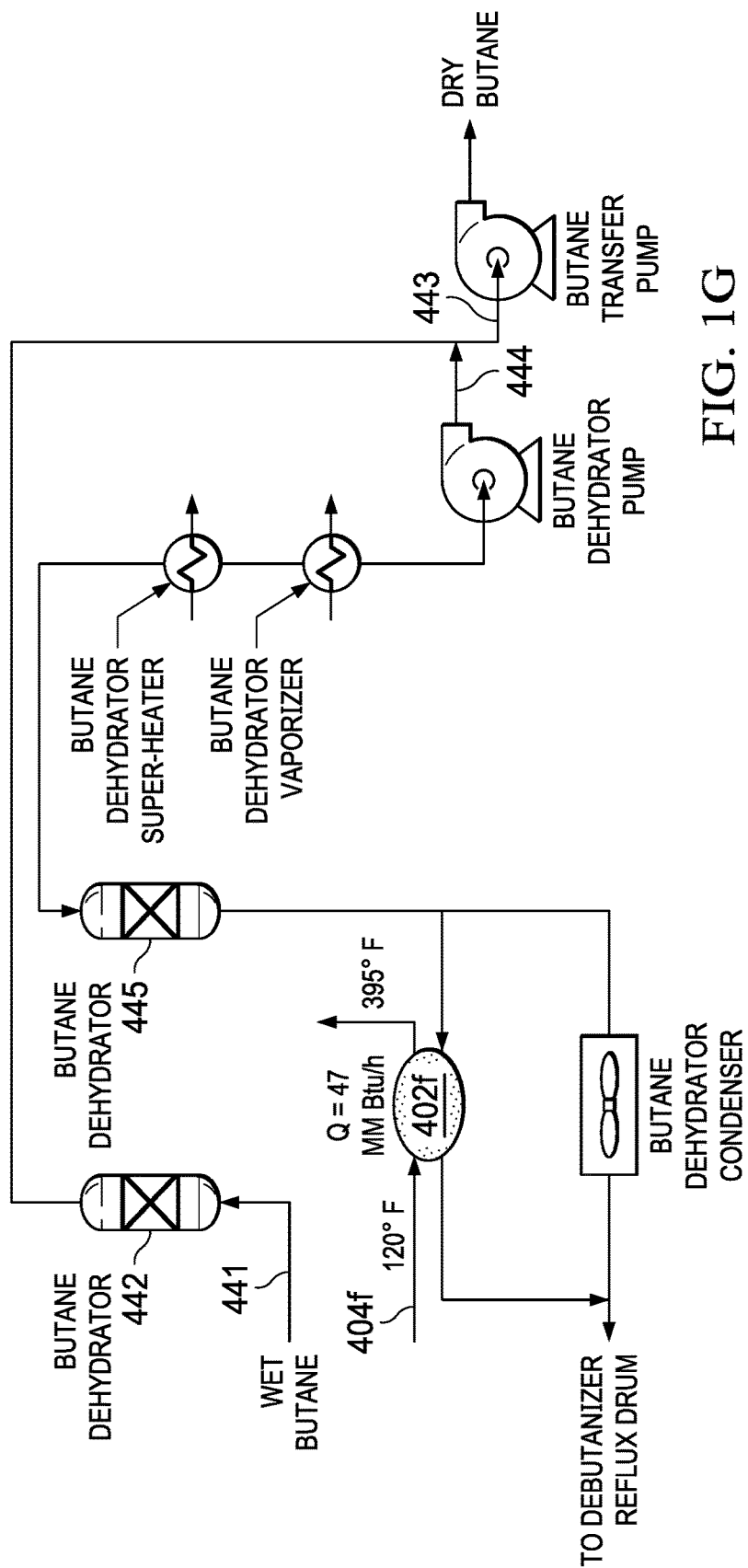
FIG. 1G is a diagram of a butane dehydrator section of a NGL fractionation plant.

Referring to FIG. 1G, in a butane dehydrator section, wet butane 441 is dehydrated in a dehydrator 442. The wet butane 441 can include, for instance, the butane gas 439 in the debutanizer section (FIG. 1F). A portion 443 of the dry butane from the dehydrator 442 is output as dry butane, for instance, to a butane refrigeration section (FIG. 1N). Another portion 444 of the butane from the dehydrator 442 is further dehydrated in a butane dehydrator 445. The dry butane 444 output from the butane dehydrator 442 is cooled in the heat exchanger 402f by exchange with the stream 404f of buffer fluid. The cooled dry butane 444 is returned to the debutanizer reflux drum 440 (FIG. 1F). The presence of the heat exchanger 402f recovers waste heat from the dry butane 444, enabling other components (for instance, cooling units or condensers) that would have been used to cool the dry butane 444 to be bypassed or eliminated from the butane dehydrator section.

The stream 404f of buffer fluid can be heated from a temperature of between about 115° F. and 125° F. (for example, about 120° F.) to a temperature of between about 390° F. and about 400° F. (for example, about 395° F.). The thermal duty of the heat exchanger 402f can be between about 25 MM Btu/h and about 125 MM Btu/h, such as about 25 MM Btu/h, about 50 MM Btu/h, about 75 MM Btu/h, about 100 MM Btu/h, or about 125 MM Btu/h.

Figure 1H:
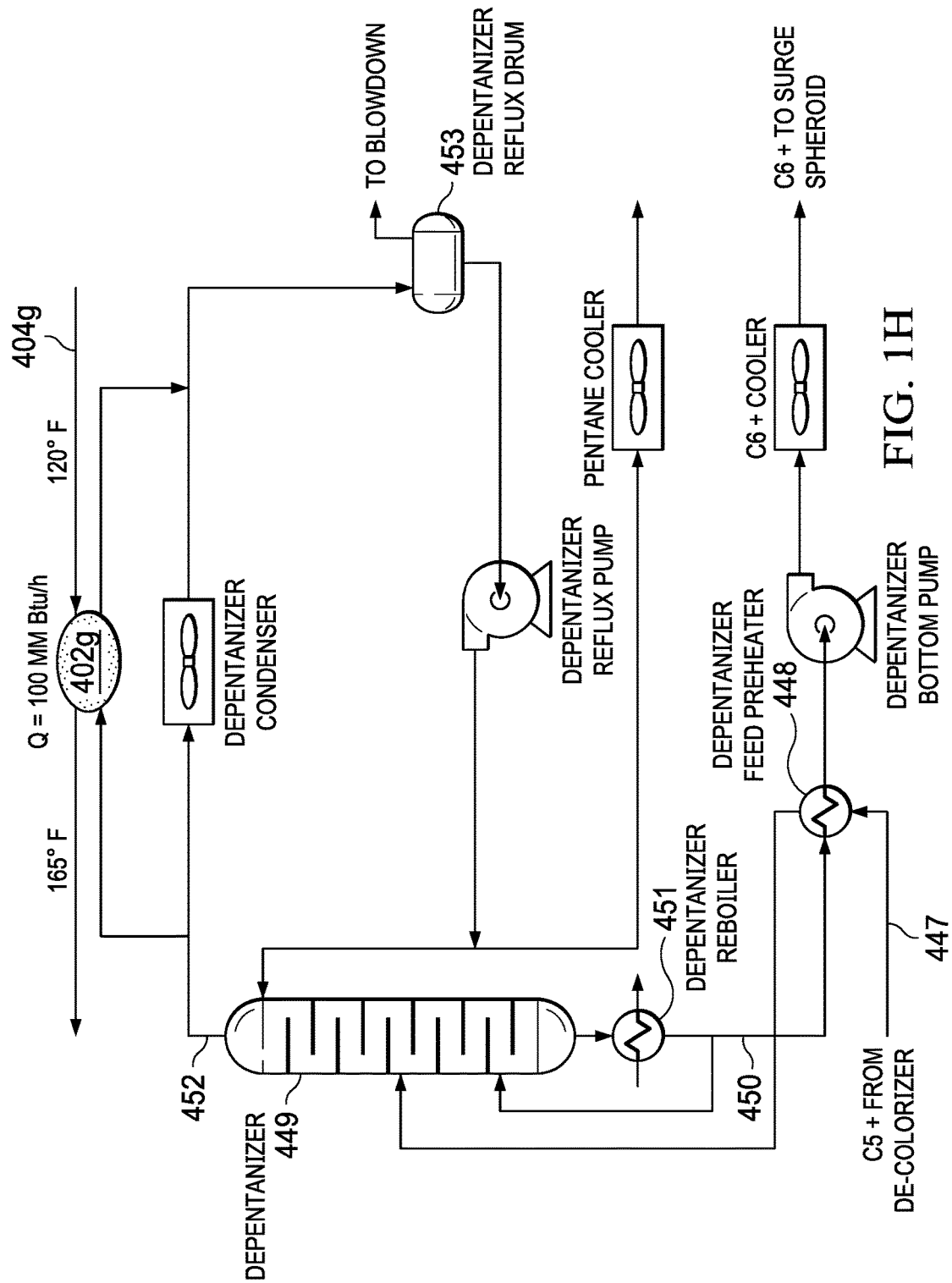
FIG. 1H is a diagram of a depentanizer section of a NGL fractionation plant.

Referring to FIG. 1H, in a depentanizer section of the natural gas liquid fractionation plant, a stream of C5+ NGL 447 received from a decolorizing section (FIG. 1J) is pre-heated in a heat exchanger 448 and provided into a depentanizer 449. A bottoms stream from the depentanizer 449 is processed in a reboiler 451, for instance, with heat provided by steam. Liquid pentane from the reboiler is returned to the depentanizer 449 and C6+ NGL bottoms 450 from the depentanizer 449 are used to heat the stream of C5+ NGL 447 in in the heat exchanger 448 and then output to storage, such as to a surge spheroid.

A top stream 452 of pentane gas from the depentanizer 449 is cooled in the heat exchanger 402g by exchange with the stream 404g of buffer fluid. The cooled pentane 452 is collected in a reflux drum 453. A portion of the liquid pentane from the reflux drum 453 is returned to the depentanizer 449, and a portion of the liquid pentane from the reflux drum 453 is sent to storage, for instance, in a petrochemical plant. The presence of the heat exchanger 402g recovers waste heat from the pentane gas 452, and enables other components (for instance, cooling units or condensers) that would have been used to cool the pentane gas 452 to be bypassed or eliminated from the depentanizer section.

The stream 404g of buffer fluid can be heated from a temperature of between about 115° F. and 125° F. (for example, about 120° F.) to a temperature of between about 160° F. and about 170° F. (for example, about 165° F.). The thermal duty of the heat exchanger 404g can be between about 50 MM Btu/h and about 150 MM Btu/h, such as about 50 MM Btu/h, about 75 MM Btu/h, about 100 MM Btu/h, or about 125 MM Btu/h, or about 150 MM Btu/h.

Figure 1I:
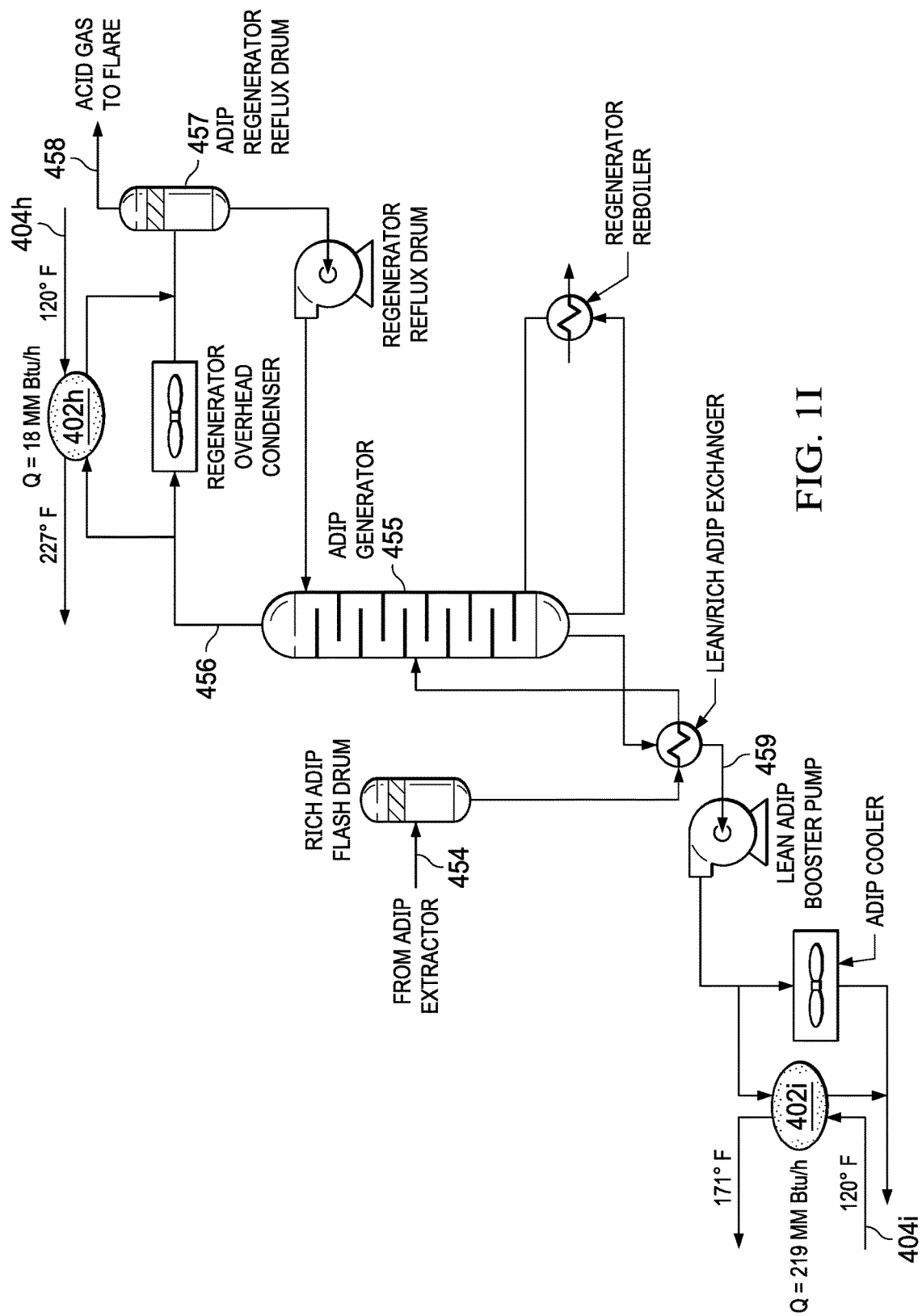
FIG. 1I is a diagram of a solvent regeneration section of a NGL fractionation plant.

Referring to FIG. 1I, in a solvent regeneration section, rich ADIP 454 from an ADIP extractor (not shown) is fed into an ADIP generator 455 to be regenerated into lean ADIP for reuse. Acid gases 456 leave the top of the ADIP generator 455 and are cooled in the heat exchanger 402h by exchange with the stream 404h of buffer fluid. The cooled acid gases 456 are refluxed in a reflux drum 457. Acid gas 458 from the reflux drum 457 is sent to flare and any remaining ADIP is returned to the ADIP generator 455. The presence of the heat exchanger 402h recovers waste heat from the acid gases 456, enabling other components (for instance, cooling units or condensers) that would have been used to cool the acid gases 456 to be bypassed or eliminated from the solvent regeneration section.

The stream 404h of buffer fluid can be heated from a temperature of between about 115° F. and 125° F. (for example, about 120° F.) to a temperature of between about 220° F. and about 230° F. (for example, about 227° F.). The thermal duty of the heat exchanger 402h can be between about 10 MM Btu/h and about 90 MM Btu/h, such as about 10 MM Btu/h, about 30 MM Btu/h, about 50 MM Btu/h, about 70 MM Btu/h, or about 90 MM Btu/h.

Lean ADIP 459 leaves the bottom of the ADIP generator 455 and is cooled in the heat exchanger 402i by exchange with the stream 404i of buffer fluid. The cooled lean ADIP 459 is returned to the ADIP extractor. The presence of the heat exchanger 402i recovers waste heat from the lean ADIP 459, enabling other components (for instance, cooling units or condensers) that would have been used to cool the lean ADIP 459 to be bypassed or eliminated from the solvent regeneration section.

The stream 404i of buffer fluid can be heated from a temperature of between about 115° F. and 125° F. (for example, about 120° F.) to a temperature of between about 165° F. and about 175° F. (for example, about 171° F.). The thermal duty of the heat exchanger 402i can be between about 150 MM Btu/h and about 250 MM Btu/h, such as about 150 MM Btu/h, about 175 MM Btu/h, about 200 MM Btu/h, about 225 MM Btu/h, or about 250 MM Btu/h.

Figure 1J:
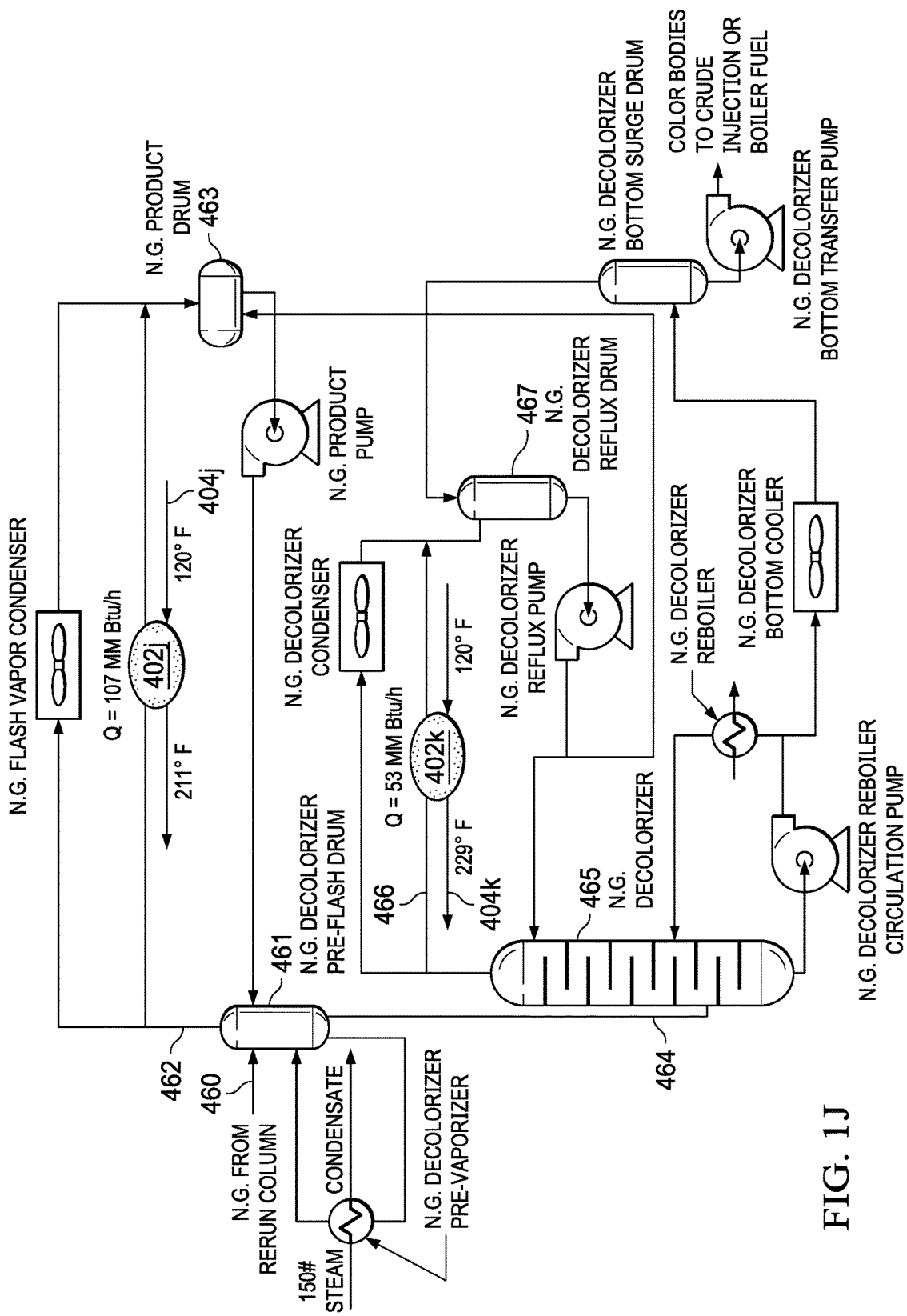
FIG. 1J is a diagram of a natural gasoline decolorizing section of a NGL fractionation plant.

Referring to FIG. 1J, in a decolorizing section of the natural gas liquid fractionation plant, NG 460 from the rerun unit is processed in a pre-flash drum 461. Light NG components 462 exit from the pre-flash drum 461 as overhead and are cooled in the heat exchanger 402j by exchange with the stream 404j of buffer fluid. The cooled light NG components 462 are stored in a product drum 463. The presence of the heat exchanger 402j recovers waste heat from the light NG components 462, enabling other components (for instance, cooling units or condensers) that would have been used to cool the light NG components 462 to be bypassed or eliminated from the decolorizing section.

The stream 404j of buffer fluid can be heated from a temperature of between about 115° F. and 125° F. (for example, about 120° F.) to a temperature of between about 205° F. and about 215° F. (for example, about 211° F.). The thermal duty of the heat exchanger 402j can be between about 50 MM Btu/h and about 150 MM Btu/h, such as about 50 MM Btu/h, about 75 MM Btu/h, about 100 MM Btu/h, about 125 MM Btu/h, or about 150 MM Btu/h.

Heavy NG components and color bodies exit from the pre-flash drum 461 as a bottoms stream 464 and are fed into a decolorizer 465. Color bodies leave the bottom of the decolorizer 465 and are pumped to a feed and surge unit to be injected into a crude line. NG leaves the decolorizer 465 as overhead NG gas 466, which is cooled in the heat exchanger 402k by exchange with the stream 404k of buffer fluid. The cooled NG gas 466 is provided to a reflux drum 467. A portion of the liquid NG from the reflux drum 467 is stored in the product drum 463 and a portion is returned to the decolorizer 465. The presence of the heat exchanger 402k recovers waste heat from the NG gas 466, enabling other components (for instance, cooling units or condensers) that would have been used to cool the NG gas 466 to be bypassed or eliminated from the decolorizing section.

The stream 404k of buffer fluid can be heated from a temperature of between about 115° F. and 125° F. (for example, about 120° F.) to a temperature of between about 225° F. and about 235° F. (for example, about 229° F.). The thermal duty of the heat exchanger 402k can be between about 25 MM Btu/h and about 125 MM Btu/h, such as about 25 MM Btu/h, about 50 MM Btu/h, about 75 MM Btu/h, about 100 MM Btu/h, or about 125 MM Btu/h.

Figure 1K:
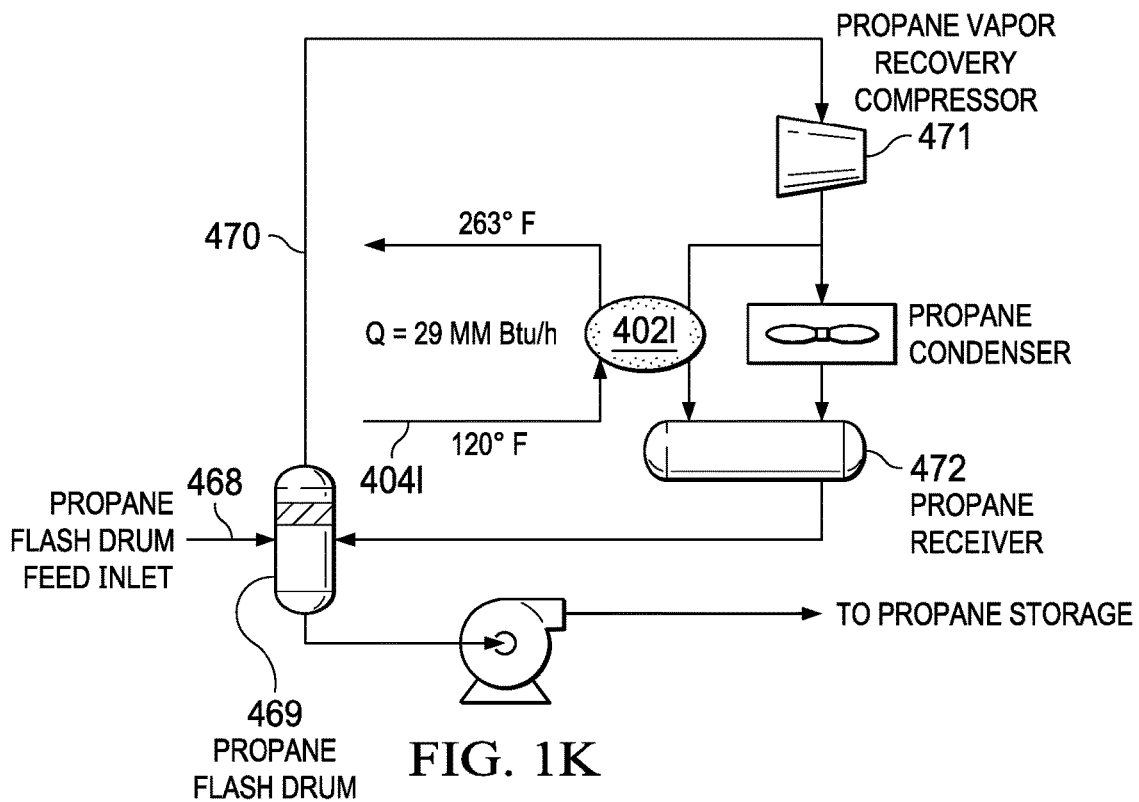
FIG. 1K is a diagram of a propane tank recovery section of a NGL fractionation plant.
Figure 1L:
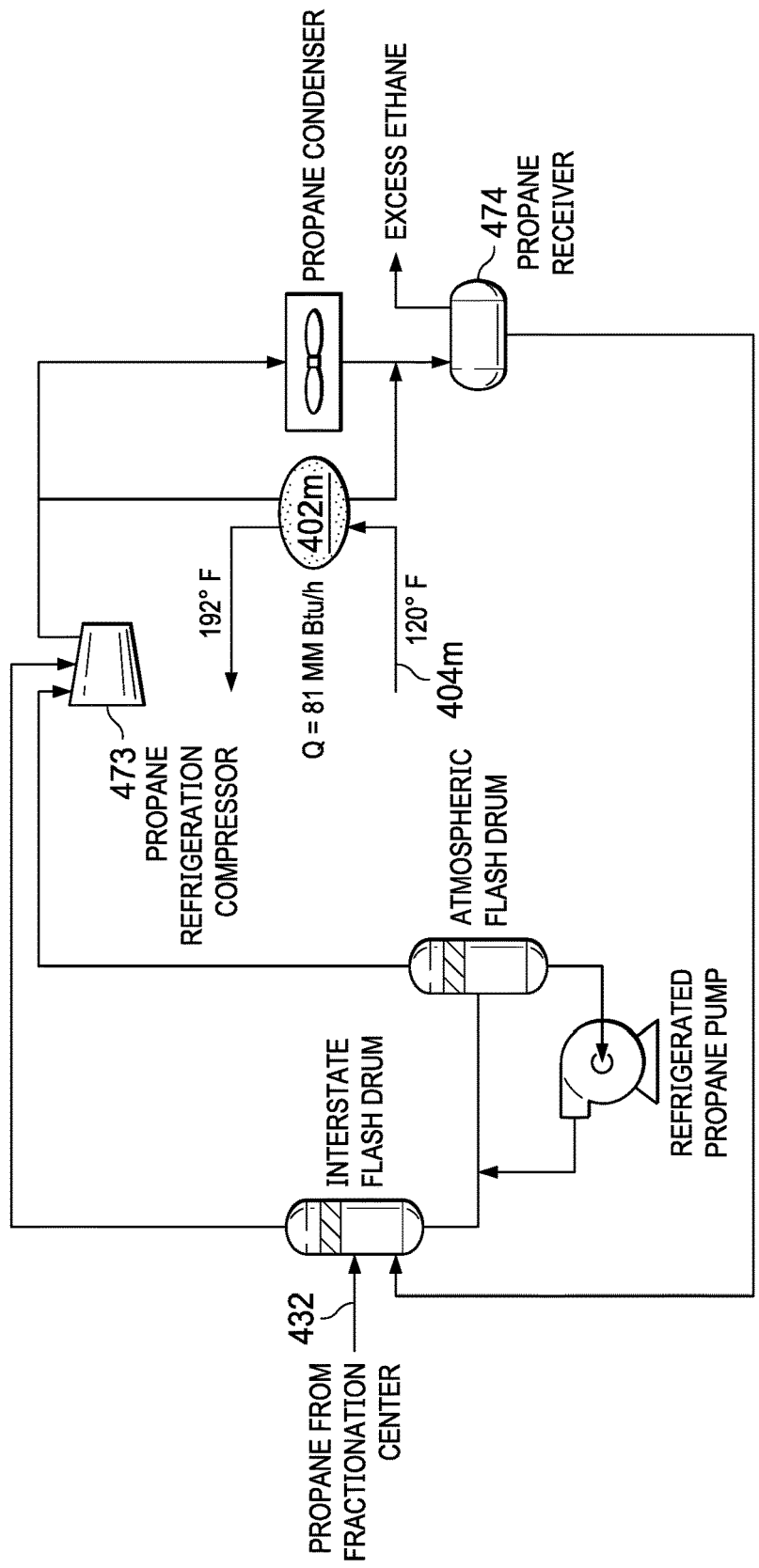
FIG. 1L is a diagram of a propane product refrigeration section of a NGL fractionation plant.

Referring to FIG. 1K, in a propane vapor recovery unit, propane 468 is received into a flash drum 469. The propane 468 can be received as propane liquid from a storage tank or as propane vapor from a tank vapor recovery header. A bottoms product of liquid propane is sent to propane storage. An overhead product 470 of propane vapor is compressed in a compressor 471 and cooled in the heat exchanger 402l by exchange with the stream 404l of buffer fluid. The cooled propane 470 is stored in a product drum 472 and returned to the flash drum 569. The presence of the heat exchanger 402l recovers waste heat from the propane vapor 470, enabling other components (for instance, cooling units or condensers) that would have been used to cool the propane vapor 470 to be bypassed or eliminated from the vapor recovery unit.

The stream 404l of buffer fluid can be heated from a temperature of between about 115° F. and 125° F. (for example, about 120° F.) to a temperature of between about 260° F. and about 270° F. (for example, about 263° F.). The thermal duty of the heat exchanger 404l can be between about 10 MM Btu/h and about 90 MM Btu/h, such as about 10 MM Btu/h, about 30 MM Btu/h, about 50 MM Btu/h, about 70 MM Btu/h, or about 90 MM Btu/h.

Referring to FIG. 1L, in a propane refrigeration section, dry propane 432 from the propane dehydration section (FIG. 1E) is compressed in a compressor 473. The compressed dry propane 432 from the compressor 473 is cooled in the heat exchanger 402m by exchange with the stream 404m of buffer fluid. The cooled dry propane 432 is stored in a propane receiver 474. The presence of the heat exchanger 402m recovers waste heat from the dry propane 432, enabling other components (for instance, cooling units or condensers) that would have been used to cool the dry propane 432 to be bypassed or eliminated from the propane refrigeration section.

The stream 404m of buffer fluid can be heated from a temperature of between about 115° F. and 125° F. (for example, about 120° F.) to a temperature of between about 190° F. and about 200° F. (for example, about 192° F.). The thermal duty of the heat exchanger 402m can be between about 50 MM Btu/h and about 150 MM Btu/h, such as about 50 MM Btu/h, about 75 MM Btu/h, about 100 MM Btu/h, about 125 MM Btu/h, or about 150 MM Btu/h.

Figure 1M:
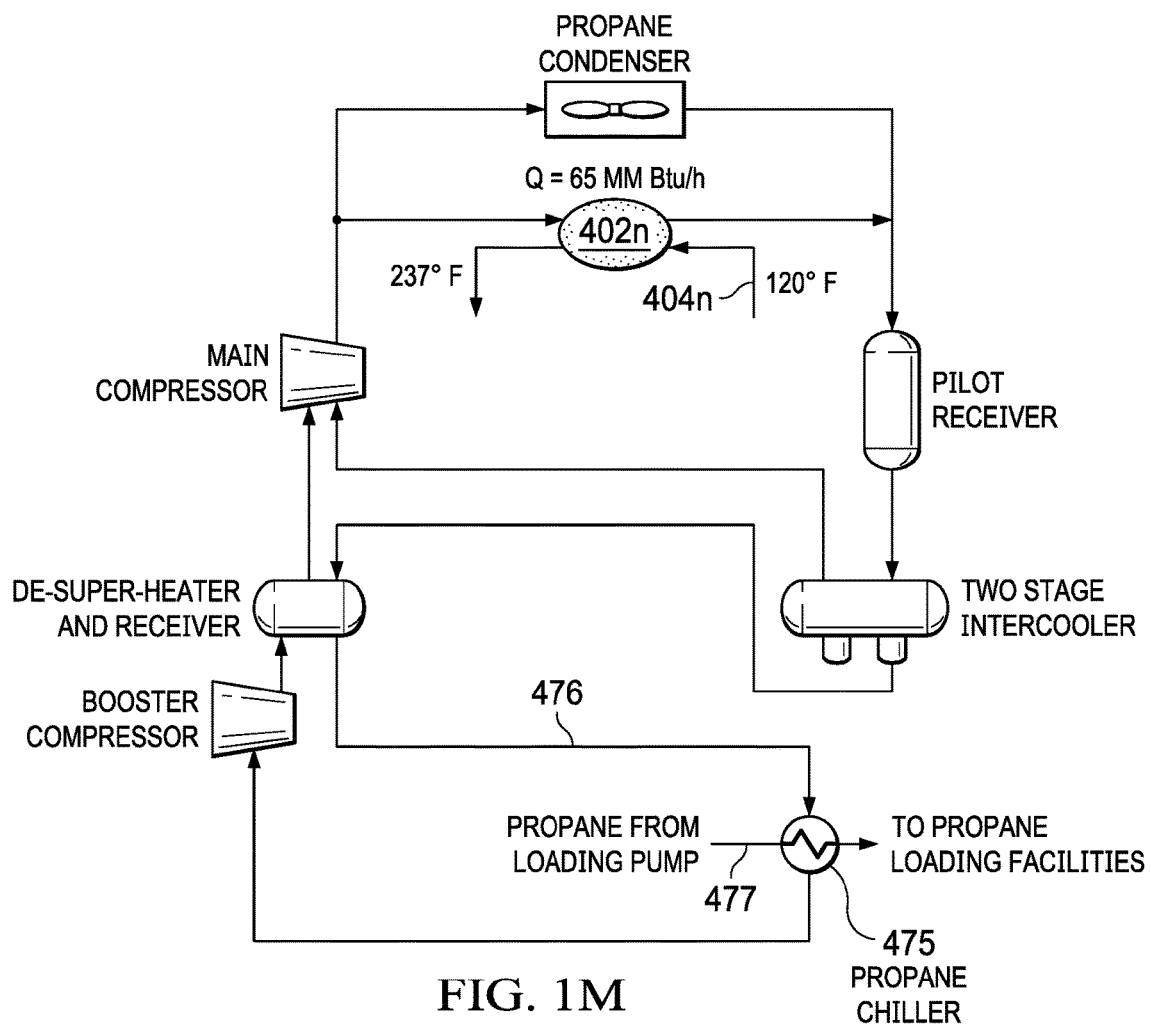
FIG. 1M is a diagram of a propane product sub-cooling section of a NGL fractionation plant.
Figure 1N:
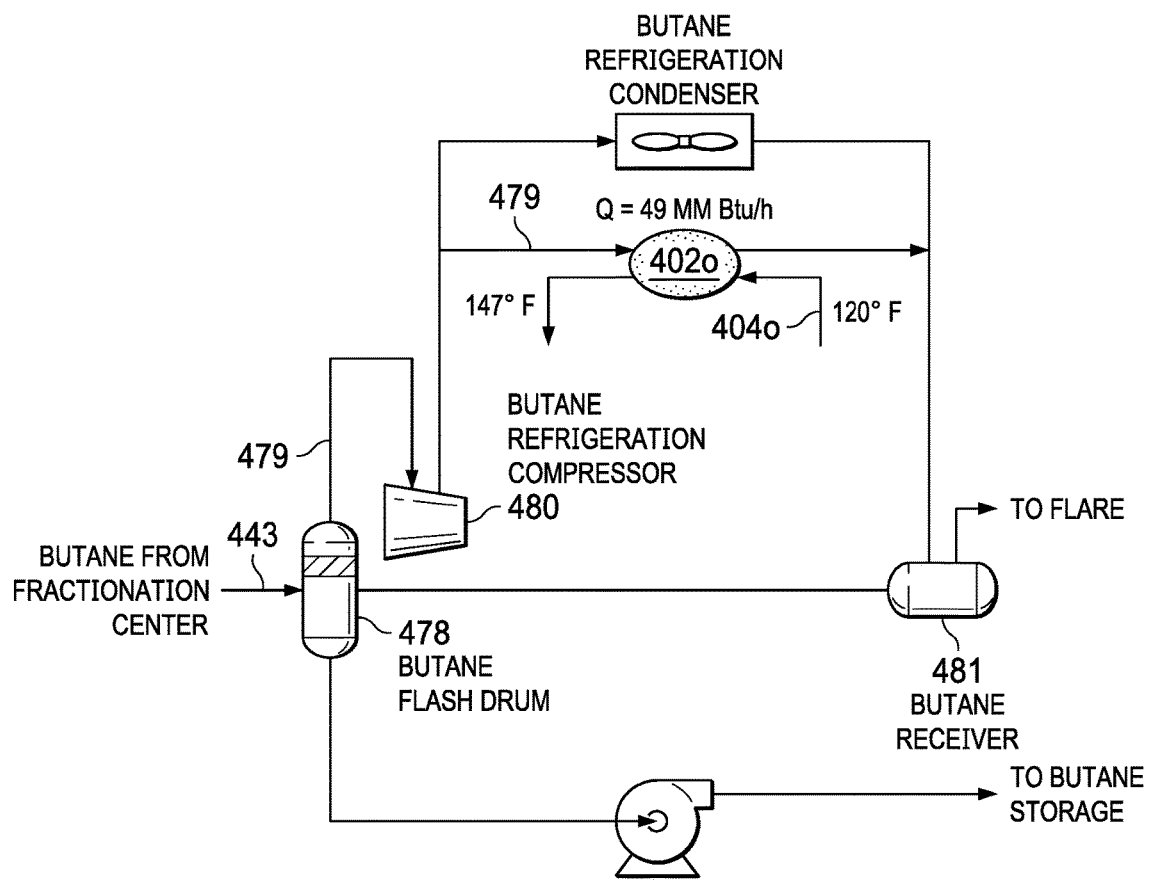
FIG. 1N is a diagram of a butane product refrigeration section of a NGL fractionation plant.

Referring to FIG. 1M, in some examples, propane product 477 can be sub-cooled in a propane product sub-cooling section by exchange in a propane chiller 475 with a cooling fluid 476, such as propane at a lower temperature. After cooling the propane product 474 in the propane chiller 475, the cooling fluid 476 is compressed and cooled in the heat exchanger 402n by exchange with the stream 404n of buffer fluid. The cooled cooling fluid 476 is returned to the propane chiller 475 for further propane cooling. The presence of the heat exchanger 402n recovers waste heat from the cooling fluid 476, enabling other components (for instance, cooling units or condensers) that would have been used to cool the cooling fluid 476 to be bypassed or eliminated from the propane product sub-cooling section.

The stream 404n of buffer fluid can be heated from a temperature of between about 115° F. and 125° F. (for example, about 120° F.) to a temperature of between about 230° F. and about 240° F. (for example, about 237° F.). The thermal duty of the heat exchanger 402n can be between about 25 MM Btu/h and about 125 MM Btu/h, such as about 25 MM Btu/h, about 50 MM Btu/h, about 75 MM Btu/h, about 100 MM Btu/h, or about 125 MM Btu/h.

Referring to FIG. 1N, in a butane refrigeration section, dry butane 443 from the butane dehydration section (FIG. 1G) is flashed in a flash drum 478. Liquid butane is sent to a storage. Butane gas 479 is compressed in a compressor 480 and the compressed dry butane 479 is cooled in the heat exchanger 402o by exchange with the stream 404o of buffer fluid. The cooled dry butane 479 is stored in a butane receiver 481. The presence of the heat exchanger 402o recovers waste heat from the dry butane 479, enabling other components (for instance, cooling units or condensers) that would have been used to cool the dry butane 479 to be bypassed or eliminated from the butane refrigeration section.

The stream 404o of buffer fluid can be heated from a temperature of between about 115° F. and 125° F. (for example, about 120° F.) to a temperature of between about 140° F. and about 150° F. (for example, about 147° F.). The thermal duty of the heat exchanger 402o can be between about 25 MM Btu/h and about 125 MM Btu/h, such as about 25 MM Btu/h, about 50 MM Btu/h, about 75 MM Btu/h, about 100 MM Btu/h, or about 125 MM Btu/h.

Figure 1O:
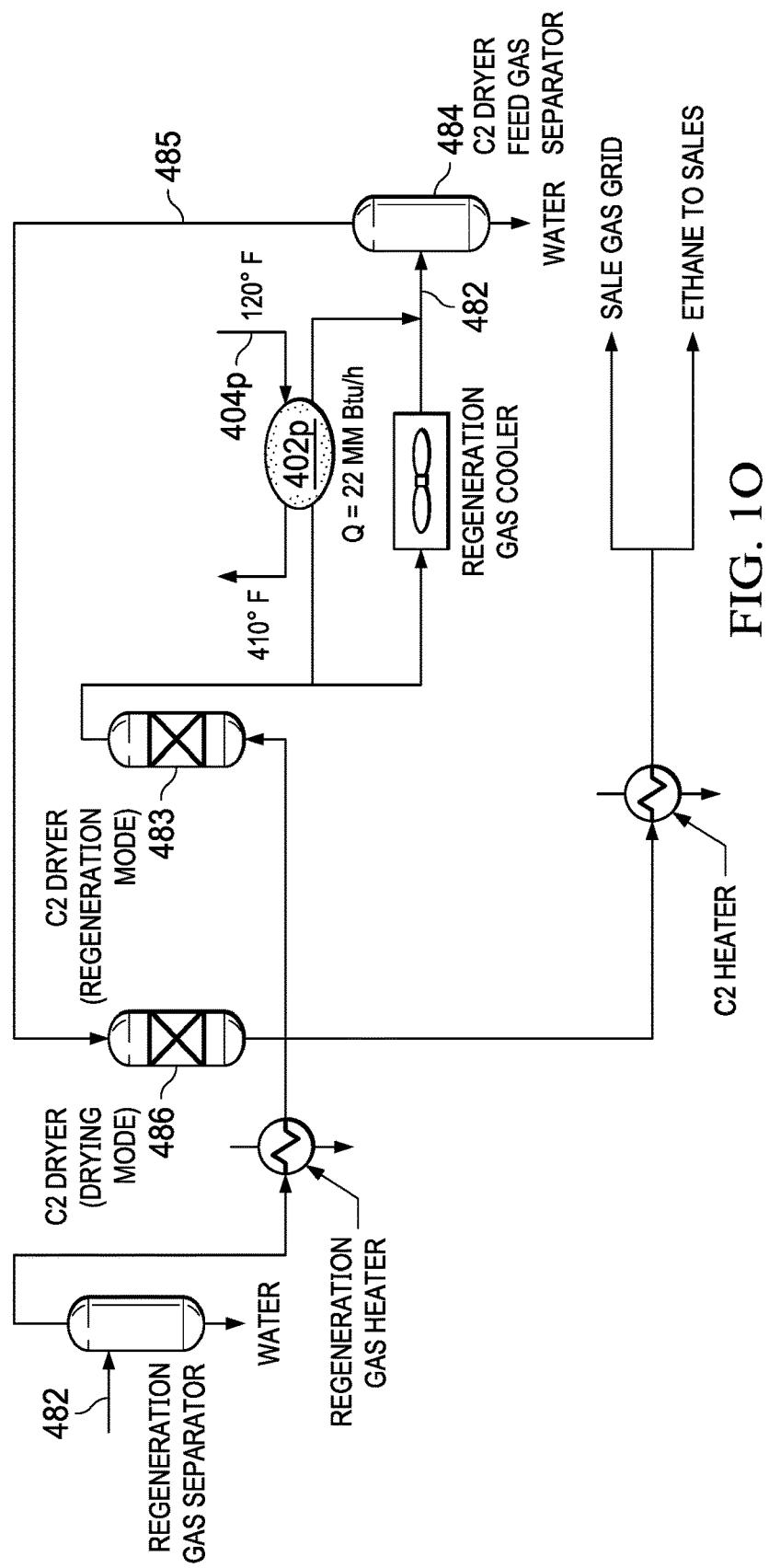
FIG. 1O is a diagram of an ethane production section of a NGL fractionation plant.
Figure 1P:
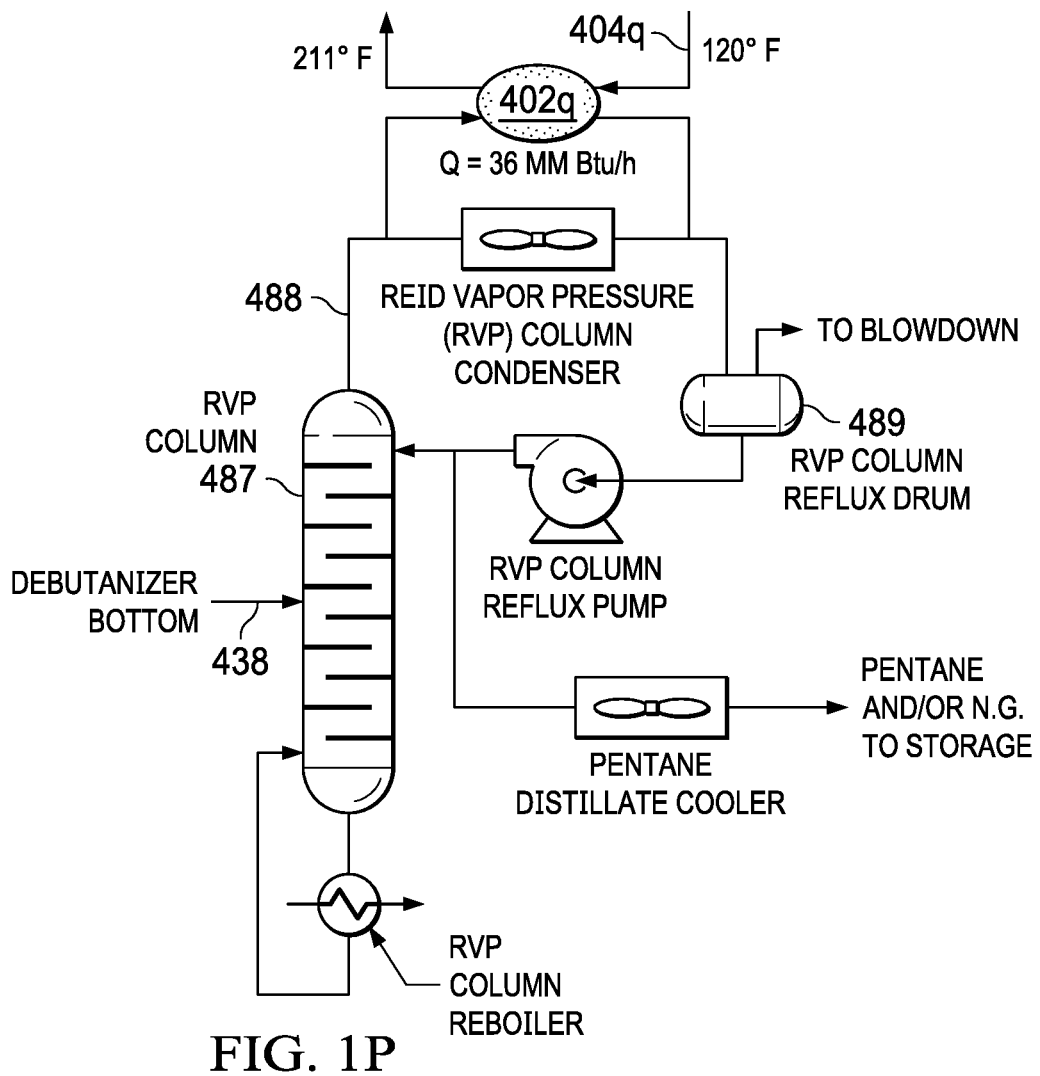
FIG. 1P is a diagram of a natural gasoline vapor section of a NGL fractionation plant.

Referring to FIG. 1O, in an ethane production section, ethane 482 is dried in a dryer 483 operating in a regeneration mode and cooled in the heat exchanger 402p by exchange with the stream 404p of buffer fluid. For instance, the ethane 482 can be ethane from a pipeline that is dried in the ethane production section before being sent to the grid. The cooled ethane 482 is separated in a feed gas separator 484 and ethane vapor 485 is further dried in a dryer 486 operating in a drying mode. Water is removed. Dry ethane output from the dryer 486 is heated and send to a sales gas grid or elsewhere. The presence of the heat exchanger 402p recovers waste heat from the ethane 482, enabling other components (for instance, cooling units or condensers) that would have been used to cool the ethane 482 to be bypassed or eliminated from the ethane production section.

The stream 404p of buffer fluid can be heated from a temperature of between about 115° F. and 125° F. (for example, about 120° F.) to a temperature of between about 405° F. and about 415° F. (for example, about 410° F.). The thermal duty of the heat exchanger 402p can be between about 10 MM Btu/h and about 90 MM Btu/h, such as about 10 MM Btu/h, about 30 MM Btu/h, about 50 MM Btu/h, about 70 MM Btu/h, or about 90 MM Btu/h.

Referring to FIG. 1P, in an NG vapor pressure control section, debutanizer bottoms 438 from the debutanizer 435 (FIG. 1E) are received into an RVP column 487. An overhead stream of pentane 488 leaves the RVP column and is cooled in the heat exchanger 402q by exchange with the stream 404q of buffer fluid. The cooled pentane 488 is provided to a reflux drum 489. A portion of the liquid pentane from the reflux drum 489 is returned to the RVP column 487 and a portion is sent to storage. The presence of the heat exchanger 402q recovers waste heat from the pentane 488, enabling other components (for instance, cooling units or condensers) that would have been used to cool the pentane 488 to be bypassed or eliminated from the NG vapor pressure control section.

The stream 404q of buffer fluid can be heated from a temperature of between about 115° F. and 125° F. (for example, about 120° F.) to a temperature of between about 205° F. and about 215° F. (for example, about 211° F.). The thermal duty of the heat exchanger 402q can be between about 10 MM Btu/h and about 90 MM Btu/h, such as about 10 MM Btu/h, about 30 MM Btu/h, about 50 MM Btu/h, about 70 MM Btu/h, or about 90 MM Btu/h.

The systems described here can enable low-grade waste heat from the NGL fractionation plant to be used for carbon-free power generation, enabling the NGL fractionation plant to be more energy efficient, less polluting, or both.

The network of heat exchangers described here can be integrated into an existing NGL fractionation plant as a retrofit or can be integrated into a newly constructed NGL fractionation plant. A retrofit to an existing NGL fractionation plant allows the efficiency, power generation, and fuel savings offered by the energy conversion systems described here to be accessible with a relatively low-capital investment. The energy conversion systems can make use of existing structure in an NGL fractionation plant while still enabling efficient waste heat recovery and conversion of waste heat to power. The integration of an energy conversion system into an existing NGL fractionation plant can be generalizable to plant-specific operating modes.

Thus, particular implementations of the subject matter have been described. Other implementations are within the scope of the following claims.

The invention claimed is:

1. A system comprising:
  a waste heat recovery heat exchanger configured to heat a buffer fluid stream by exchange with a heat source in a natural gas liquid fractionation plant;
  a Kalina cycle energy conversion system including:
    one or more first energy conversion heat exchangers configured to heat a working fluid by exchange with the heated buffer fluid stream;
    a separator configured to receive the heated working fluid and to output a vapor stream of the working fluid and the liquid stream of the working fluid; and
    a turbine and a generator, wherein the turbine and generator are configured to generate power by expansion of the vapor stream of the working fluid.

2. The system of claim 1, wherein the turbine and generator are configured to generate at least 40 MW of power.

3. The system of claim 1, wherein the energy conversion system comprises a pump configured to pump the working fluid to a pressure of between 7 Bar and 8 Bar.

4. The system of claim 1, wherein the one or more first energy conversion heat exchangers comprise:
  an energy conversion heat exchanger having a thermal duty of between 250 MM Btu/h and 350 MM Btu/h; and
  an energy conversion heat exchanger having a thermal duty of between 1300 MM Btu/h and about 1500 MM Btu/h.

5. The system of claim 1, wherein the one or more first energy conversion heat exchangers are configured to heat a first portion of the working fluid, and wherein the Kalina cycle energy conversion system comprises one or more second energy conversion heat exchangers configured to heat a second portion of the working fluid by exchange with the liquid stream of the working fluid.

6. The system of claim 5, wherein the separator is configured to receive the heated first and second portions of the working fluid.

7. The system of claim 5, wherein the one or more second energy conversion heat exchangers are configured to heat the second portion of the working fluid by exchange with the heated buffer fluid stream.

8. The system of claim 1, comprising a second turbine configured to generate power from the liquid stream of the working fluid.

9. The system of claim 8, wherein the second turbine is configured to generate at least 1 MW of power.

10. The system of claim 8, wherein the second turbine comprises a high pressure recovery turbine.

11. The system of claim 1, wherein the Kalina cycle energy conversion system comprises a cooler configured to cool the vapor stream of the working fluid and the liquid stream of the working fluid after power generation, wherein the cooler has a thermal duty of between 2500 MM Btu/h and 3500 MM Btu/h.

12. The system of claim 1, comprising a storage tank, wherein the buffer fluid stream flows from the storage tank, through the waste heat recovery heat exchanger, through the Kalina cycle energy conversion system, and back to the storage tank.

13. The system of claim 1, wherein the waste heat recovery heat exchanger is configured to heat the buffer fluid stream by exchange with a refrigerant in the natural gas liquid fractionation plant.

14. The system of claim 13, wherein the refrigerant is used to cool ethane gas output from a deethanizer in the natural gas liquid fractionation plant.

15. The system of claim 1, wherein the waste heat recovery heat exchanger is configured to heat the buffer fluid stream by exchange with propane gas output from a depropanizer in the natural gas liquid fractionation plant.

16. The system of claim 1, wherein the waste heat recovery heat exchanger is configured to heat the buffer fluid stream by exchange with propane gas output from a propane dehydrator in the natural gas liquid fractionation plant.

17. The system of claim 1, wherein the waste heat recovery heat exchanger is configured to heat the buffer fluid stream by exchange with a C5+ bottoms product from a debutanizer in the natural gas liquid fractionation plant.

18. The system of claim 1, wherein the waste heat recovery heat exchanger is configured to heat the buffer fluid stream by exchange with butane gas output from a debutanizer in the natural gas liquid fractionation plant.

19. The system of claim 1, wherein the waste heat recovery heat exchanger is configured to heat the buffer fluid stream by exchange with butane gas output from a butane dehydrator in the natural gas liquid fractionation plant.

20. The system of claim 1, wherein the waste heat recovery heat exchanger is configured to heat the buffer fluid stream by exchange with pentane gas output from a depentanizer in the natural gas liquid fractionation plant.

21. The system of claim 1, wherein the waste heat recovery exchanger is configured to heat the buffer fluid stream by exchange with acid gases output from an ADIP generator in the natural gas liquid fractionation plant.

22. The system of claim 1, wherein the waste heat recovery exchanger is configured to heat the buffer fluid stream by exchange with lean ADIP output from an ADIP generator in the natural gas liquid fractionation plant.

23. The system of claim 1, wherein the waste heat recovery exchanger is configured to heat the buffer fluid stream by exchange with light NG components output from a pre-flash drum in a decolorizing section of the natural gas liquid fractionation plant.

24. The system of claim 1, wherein the waste heat recovery exchanger is configured to heat the buffer fluid stream by exchange with NG gas output from a decolorizer in the natural gas liquid fractionation plant.

25. The system of claim 1, wherein the waste heat recovery exchanger is configured to heat the buffer fluid stream by exchange with compressed propane in the natural gas liquid fractionation plant.

26. The system of claim 1, wherein the waste heat recovery exchanger is configured to heat the buffer fluid stream by exchange with compressed butane in the natural gas liquid fractionation plant.

27. The system of claim 1, wherein the waste heat recovery exchanger is configured to heat the buffer fluid stream by exchange with dry ethane gas in the natural gas liquid fractionation plant.

28. The system of claim 1, wherein the waste heat recovery exchanger is configured to heat the buffer fluid stream by exchange with pentane gas output from an RVP column in the natural gas liquid fractionation plant.

29. A method comprising:
heating a buffer fluid stream via a waste heat recovery heat exchanger by exchange with a heat source in a natural gas liquid fractionation plant; and
generating power in a Kalina cycle energy conversion system, comprising:
heating a working fluid via one or more first energy conversion heat exchangers by exchange with the heated buffer fluid stream;
separating, in a separator, the heated working fluid into a vapor stream of the working fluid and the liquid stream of the working fluid; and
generating power, by a first turbine and generator, by expansion of the vapor stream of the working fluid.

30. The method of claim 29, wherein generating power by the first turbine and generator includes generating at least 40 MW of power.

31. The method of claim 29, comprising pumping the working fluid to a pressure of between 7 Bar and 8 Bar.

32. The method of claim 29, wherein heating the working fluid comprises heating the working fluid to a temperature of between 160° F. and 180° F.

33. The method of claim 29, wherein heating the working fluid comprises heating a first portion of the working fluid by exchange with the heated buffer fluid, and comprising heating a second portion of the working fluid via one or more second energy conversion heat exchangers by exchange with the liquid stream of the working fluid.

34. The method of claim 29, comprising generating power from the liquid stream of the working fluid by a second turbine.

35. The method of claim 34, wherein generating power by the second turbine comprises generating at least 1 MW of power.

36. The method of claim 29, comprising cooling the vapor stream of the working fluid and the liquid stream of the working fluid after power generation, wherein the cooler has a thermal duty of between 2500 MM Btu/h and 3500 MM Btu/h.

37. The method of claim 29, comprising flowing the buffer fluid stream from a storage tank, through the waste heat recovery exchanger, through the Kalina cycle energy conversion system, and back to the storage tank.

38. The method of claim 29, wherein the waste heat recovery heat exchanger is configured to heat the buffer fluid stream by exchange with a refrigerant in the natural gas liquid fractionation plant.

39. The method of claim 38, wherein the refrigerant is used to cool ethane gas output from a deethanizer in the natural gas liquid fractionation plant.

40. The method of claim 29, wherein heating the buffer fluid stream comprises heating the buffer fluid stream by exchange with propane gas output from a depropanizer in the natural gas liquid fractionation plant.

41. The method of claim 29, wherein heating the buffer fluid stream comprises heating the buffer fluid stream by exchange with propane gas output from a propane dehydrator in the natural gas liquid fractionation plant.

42. The method of claim 29, wherein heating the buffer fluid stream comprises heating the buffer fluid stream by exchange with a C5+ bottoms product from a debutanizer in the natural gas liquid fractionation plant.

43. The method of claim 29, wherein heating the buffer fluid stream comprises heating the buffer fluid stream by exchange with butane gas output from a debutanizer in the natural gas liquid fractionation plant.

44. The method of claim 29, wherein heating the buffer fluid stream comprises heating the buffer fluid stream by exchange with butane gas output from a butane dehydrator in the natural gas liquid fractionation plant.

45. The method of claim 29, wherein heating the buffer fluid stream comprises heating the buffer fluid stream by exchange with pentane gas output from a depentanizer in the natural gas liquid fractionation plant.

46. The method of claim 29, wherein heating the buffer fluid stream comprises heating the buffer fluid stream by exchange with acid gases output from an ADIP generator in the natural gas liquid fractionation plant.

47. The method of claim 29, wherein heating the buffer fluid stream comprises heating the buffer fluid stream by exchange with lean ADIP output from an ADIP generator in the natural gas liquid fractionation plant.

48. The method of claim 29, wherein heating the buffer fluid stream comprises heating the buffer fluid stream by exchange with light NG components output from a pre-flash drum in a decolorizing section of the natural gas liquid fractionation plant.

49. The method of claim 29, wherein heating the buffer fluid stream comprises heating the buffer fluid stream by exchange with NG gas output from a decolorizer in the natural gas liquid fractionation plant.

50. The method of claim 29, wherein heating the buffer fluid stream comprises heating the buffer fluid stream by exchange with compressed propane in the natural gas liquid fractionation plant.

51. The method of claim 29, wherein heating the buffer fluid stream comprises heating the buffer fluid stream by exchange with compressed butane in the natural gas liquid fractionation plant.

52. The method of claim 29, wherein heating the buffer fluid stream comprises heating the buffer fluid stream by exchange with dry ethane gas in the natural gas liquid fractionation plant.

53. The method of claim 29, wherein heating the buffer fluid stream comprises heating the buffer fluid stream by exchange with pentane gas output from an RVP column in the natural gas liquid fractionation plant.

\* \* \* \* \*